(12) United States Patent  
Kobayashi

(10) Patent No.: US 7,466,451 B2
(45) Date of Patent: Dec. 16, 2008

(54) METHOD AND APPARATUS FOR CONVERTING MOTION IMAGE DATA, AND METHOD AND APPARATUS FOR REPRODUCING MOTION IMAGE DATA

(75) Inventor: Seiji Kobayashi, Tokyo (JP)

(73) Assignee: Sony Corporation (JP)

( * ) Notice: Subject to any disclaimer, the term of this patent is extended or adjusted under 35 U.S.C. 154(b) by 757 days.

(21) Appl. No.: 11/178,537

(22) Filed: Jul. 12, 2005

(65) Prior Publication Data

US 2006/0023089 A1    Feb. 2, 2006

(30) Foreign Application Priority Data

Jul. 30, 2004   (JP)   ............... 2004-223782

(51) Int. Cl.
    G06F 15/00   (2006.01)
    H04N 1/60    (2006.01)
    G06K 1/00    (2006.01)
(52) U.S. Cl. ........................ 358/1.9; 358/512
(58) Field of Classification Search .......... 358/1.9, 358/512, 515, 518; 348/14.1, 33, 34, 60, 348/70
    See application file for complete search history.

(56) References Cited

U.S. PATENT DOCUMENTS 6,507,364 B1 *  1/2003  Bishay et al. ............... 348/242
2004/0218069 A1 *  11/2004  Silverstein

FOREIGN PATENT DOCUMENTS

JP         2002-027466         1/2002

* cited by examiner

*Primary Examiner*—Douglas Q Tran
(74) *Attorney, Agent, or Firm*—Rader Fishman & Grauer PLLC; Ronald P. Kananen

(57) ABSTRACT

A motion image data conversion apparatus includes an input unit configured to input motion image data in the form of color mosaic image data each pixel of which has single-color component data, and a spatial decimator configured to input motion image data from the input unit and perform a spatial decimation process separately on each color component data of the color mosaic image data. The spatial decimator selects one or more representative values for each color component data of the color mosaic image data and produces spatially decimated data composed of selected representative values.

18 Claims, 28 Drawing Sheets

FIG. 1

| R | G | R | G |
|---|---|---|---|
| G | B | G | B |
| R | G | R | G |
| G | B | G | B |

FIG. 10

|    | VIEWED POINT ↓ P1 | P2 | P3 | P4 | P5 | P6 | P7 | P8 |
|----|----|----|----|----|----|----|----|----|
| F1 | A | B | C | D | E | F | G | H |
| F2 | Z | A | B | C | D | E | F | G |
| F3 | Y | Z | A | B | C | D | E | F |
| F4 | X | Y | Z | A | B | C | D | E |
| F5 | W | X | Y | Z | A | B | C | D |
| F6 | V | W | X | Y | Z | A | B | C |
| F7 | U | V | W | X | Y | Z | A | B |
| F8 | T | U | V | W | X | Y | Z | A |

FIG. 11

|  | P1 | P2 | P3 | P4 | P5 | P6 | P7 | P8 |
|---|---|---|---|---|---|---|---|---|
| F1 | B (VIEWED POINT) | B | B | B | F | F | F | F |
| F2 | A | A | A | A | E | E | E | E |
| F3 | Z | Z | Z | Z | D | D | D | D |
| F4 | Y | Y | Y | Y | C | C | C | C |
| F5 | X | X | X | X | B | B | B | B |
| F6 | W | W | W | W | A | A | A | A |
| F7 | V | V | V | V | Z | Z | Z | Z |
| F8 | U | U | U | U | Y | Y | Y | Y |

FIG. 12A

| 0.25 | 0.25 | 0.25 | 0.25 |

FIG. 12B

| 0.25 |
|------|
| 0.25 |
| 0.25 |
| 0.25 |

| G | B | G | B |
|---|---|---|---|
| R | G | R | G |
| G | B | G | B |
| R | G | R | G |
| G | B | G | B |
| R | G | R | G |
| G | B | G | B |
| R | G | R | G |

FIG. 22A

| $R_{00}$ | $G_{01}$ | $R_{02}$ | $G_{03}$ | $R_{04}$ | $G_{05}$ | $R_{06}$ | $G_{07}$ |
|---|---|---|---|---|---|---|---|
| $G_{10}$ | $B_{11}$ | $G_{12}$ | $B_{13}$ | $G_{14}$ | $B_{15}$ | $G_{16}$ | $B_{17}$ |
| $R_{20}$ | $G_{21}$ | $R_{22}$ | $G_{23}$ | $R_{24}$ | $G_{25}$ | $R_{26}$ | $G_{27}$ |
| $G_{30}$ | $B_{31}$ | $G_{32}$ | $B_{33}$ | $G_{34}$ | $B_{35}$ | $G_{36}$ | $B_{37}$ |

FIG. 22B

| $G_{01}$ | $G_{05}$ | |
|---|---|---|
| $G_{10}$ | $G_{14}$ | $G_{18}$ |
| $G_{21}$ | $G_{25}$ | |
| $G_{30}$ | $G_{34}$ | $G_{38}$ |

FIG. 22C

| $R_{00}$ | $R_{04}$ | $R_{08}$ |
|---|---|---|
| $R_{10}$ | $R_{14}$ | $R_{18}$ |
| $R_{20}$ | $R_{24}$ | $R_{28}$ |
| $R_{30}$ | $R_{34}$ | $R_{38}$ |

FIG. 22D

| $B_{01}$ | $B_{05}$ |
|---|---|
| $B_{11}$ | $B_{15}$ |
| $B_{21}$ | $B_{25}$ |
| $B_{31}$ | $B_{35}$ |

FIG. 23A

|R$_{00}$|G$_{01}$|R$_{02}$|G$_{03}$|R$_{04}$|G$_{05}$|R$_{06}$|G$_{07}$|
|---|---|---|---|---|---|---|---|
|G$_{10}$|B$_{11}$|G$_{12}$|B$_{13}$|G$_{14}$|B$_{15}$|G$_{16}$|B$_{17}$|
|R$_{20}$|G$_{21}$|R$_{22}$|G$_{23}$|R$_{24}$|G$_{25}$|R$_{26}$|G$_{27}$|
|G$_{30}$|B$_{31}$|G$_{32}$|B$_{33}$|G$_{34}$|B$_{35}$|G$_{36}$|B$_{37}$|

FIG. 23B

| G$_{0x}$ | G$_{01}$ | G$_{03}$ | G$_{05}$ | G$_{07}$ |
|---|---|---|---|---|
| G$_{10}$ | G$_{12}$ | G$_{14}$ | G$_{16}$ | |
| G$_{2x}$ | G$_{21}$ | G$_{23}$ | G$_{25}$ | G$_{27}$ |
| G$_{30}$ | G$_{32}$ | G$_{34}$ | G$_{36}$ | |

FIG. 23C

| R$_{00}$ | R$_{02}$ | R$_{04}$ | R$_{06}$ |
|---|---|---|---|
| R$_{10}$ | R$_{12}$ | R$_{14}$ | R$_{16}$ |
| R$_{20}$ | R$_{22}$ | R$_{24}$ | R$_{26}$ |
| R$_{30}$ | R$_{32}$ | R$_{34}$ | R$_{36}$ |

FIG. 23D

| B$_{0x}$ | B$_{01}$ | B$_{03}$ | B$_{05}$ | B$_{07}$ |
|---|---|---|---|---|
| B$_{1x}$ | B$_{11}$ | B$_{13}$ | B$_{15}$ | B$_{17}$ |
| B$_{2x}$ | B$_{21}$ | B$_{23}$ | B$_{25}$ | B$_{27}$ |
| B$_{3x}$ | B$_{31}$ | B$_{33}$ | B$_{35}$ | B$_{37}$ |

FIG. 24

| G | R | G | B |
|---|---|---|---|
| B | G | R | G |
| G | B | G | R |
| R | G | B | G |
| G | R | G | B |
| B | G | R | G |
| G | B | G | R |
| R | G | B | G |

FIG. 25A

| $R_{00}$ | $G_{01}$ | $B_{02}$ | $G_{03}$ | $R_{04}$ | $G_{05}$ | $B_{06}$ | $G_{07}$ |
|---|---|---|---|---|---|---|---|
| $G_{10}$ | $B_{11}$ | $G_{12}$ | $R_{13}$ | $G_{14}$ | $B_{15}$ | $G_{16}$ | $R_{17}$ |
| $B_{20}$ | $G_{21}$ | $R_{22}$ | $G_{23}$ | $B_{24}$ | $G_{25}$ | $R_{26}$ | $G_{27}$ |
| $G_{30}$ | $R_{31}$ | $G_{32}$ | $B_{33}$ | $G_{34}$ | $R_{35}$ | $G_{36}$ | $B_{37}$ |

FIG. 25B

| $G_{01}$ | | $G_{05}$ | |
|---|---|---|---|
| $G_{10}$ | | $G_{14}$ | $G_{18}$ |
| $G_{21}$ | | $G_{25}$ | |
| $G_{30}$ | | $G_{34}$ | $G_{38}$ |

FIG. 25C

| $R_{00}$ | | $R_{04}$ | $R_{08}$ |
|---|---|---|---|
| $R_{1x}$ | $R_{13}$ | | $R_{17}$ |
| $R_{2x}$ | $R_{22}$ | | $R_{26}$ |
| $R_{31}$ | | $R_{35}$ | |

FIG. 25D

| $B_{0x}$ | $B_{02}$ | $B_{06}$ | |
|---|---|---|---|
| $B_{11}$ | | $B_{15}$ | |
| $B_{20}$ | $B_{24}$ | | $B_{28}$ |
| $B_{3x}$ | $B_{33}$ | $B_{37}$ | |

FIG. 26A

| $R_{00}$ | $G_{01}$ | $B_{02}$ | $G_{03}$ | $R_{04}$ | $G_{05}$ | $B_{06}$ | $G_{07}$ |
|---|---|---|---|---|---|---|---|
| $G_{10}$ | $B_{11}$ | $G_{12}$ | $R_{13}$ | $G_{14}$ | $B_{15}$ | $G_{16}$ | $R_{17}$ |
| $B_{20}$ | $G_{21}$ | $R_{22}$ | $G_{23}$ | $B_{24}$ | $G_{25}$ | $R_{26}$ | $G_{27}$ |
| $G_{30}$ | $R_{31}$ | $G_{32}$ | $B_{33}$ | $G_{34}$ | $R_{35}$ | $G_{36}$ | $B_{37}$ |

FIG. 26B

| $G_{0x}$ | $G_{01}$ | $G_{03}$ | $G_{05}$ | $G_{07}$ |
|---|---|---|---|---|
| $G_{10}$ | $G_{12}$ | $G_{14}$ | $G_{16}$ | |
| $G_{0x}$ | $G_{01}$ | $G_{03}$ | $G_{05}$ | $G_{07}$ |
| $G_{10}$ | $G_{12}$ | $G_{14}$ | $G_{16}$ | |

FIG. 26C

| $R_{00}$ | $R_{02}$ | $R_{04}$ | $R_{06}$ | |
|---|---|---|---|---|
| $R_{1x}$ | $R_{11}$ | $R_{13}$ | $R_{15}$ | $R_{17}$ |
| $R_{20}$ | $R_{22}$ | $R_{24}$ | $R_{26}$ | |
| $R_{3x}$ | $R_{31}$ | $R_{33}$ | $R_{35}$ | $R_{37}$ |

FIG. 26D

| $B_{00}$ | $B_{02}$ | $B_{04}$ | $B_{06}$ | |
|---|---|---|---|---|
| $B_{1x}$ | $B_{11}$ | $B_{13}$ | $B_{15}$ | $B_{17}$ |
| $B_{20}$ | $B_{22}$ | $B_{24}$ | $B_{26}$ | |
| $B_{3x}$ | $B_{31}$ | $B_{33}$ | $B_{35}$ | $B_{37}$ |

FIG. 28

| Ye | Cy | Ye | Cy |
|---|---|---|---|
| G | Mg | G | Mg |
| Ye | Cy | Ye | Cy |
| G | Mg | G | Mg |

METHOD AND APPARATUS FOR CONVERTING MOTION IMAGE DATA, AND METHOD AND APPARATUS FOR REPRODUCING MOTION IMAGE DATA

CROSS REFERENCES TO RELATED APPLICATIONS

The present invention contains subject matter related to Japanese Patent Application JP 2004-223782 filed in the Japanese Patent Office on Jul. 30, 2004, the entire contents of which are incorporated herein by reference.

BACKGROUND OF THE INVENTION

1. Field of the Invention

The present invention relates to a method and apparatus for converting motion image data and also to a method and apparatus for reproducing motion image data. More particularly, the present invention relates to a method and apparatus for converting motion image data such that image data output from a single-plate solid-state color image sensor is compressed depending on the amount of motion measured for each block of the image data into a form that allows it to reproduce high-quality image data having no significant degradation in image quality, and also relates to a method and apparatus for reproducing high-quality motion image data.

2. Description of the Related Art

A single-plate solid-state color image sensor has a color filter disposed on the surface of each pixel of the image sensor such that only a particular wavelength component of light can pass through the filter and reach the image sensor. The color of each point of an image is represented by a combination of color components sensed by a plurality of pixels. The color filters disposed on the surfaces of the respective pixels have different colors assigned thereto depending on the positions of the pixels. FIG. 1 shows an example of a color pattern of the color filter array. In this example shown in FIG. 1, each color of red (R), green (G), and blue (B) is represented by a set of four pixels. The color pattern shown in FIG. 1 is called a Bayer array. In the single-plate solid-state color image sensor, as described above, each pixel provides information of one color selected from R, G, and B. The other missing color components at each pixel are acquired by interpolation from color information provided from neighboring pixels. This process of reproducing necessary color components to acquire a complete set of color components for each pixel is called demosaicing.

FIG. 2 shows an example of an image pickup apparatus including a single-plate solid-state color image sensor. Of various color components of light passing through an optical lens 1, only a particular color component passing through a color filter 2 reaches the single-plate solid-state color image sensor. The solid-state image sensor 3 converts an optical image into an electrical signal and outputs the resultant image signal in the form the electrical signal. The output image signal is converted into a digital signal by a digital-to-analog converter (not shown), and supplied to a camera signal processor 4. In the camera signal processor 4, the image signal is subjected to processing such as clipping, a gamma correction, a white balance correction, and demosacing. The resultant image signal is supplied to a motion image compressor 5. The motion image compressor 5 compresses the data size of the motion image signal and outputs the compressed motion image signal in a predetermined motion image format. A recording unit 6 records the motion image data in the compressed form on a recording medium. The compression of motion image data is not necessarily needed. However, in recent years, a great increase in the number of pixels of the image sensor has been achieved, which results in an increase in the data size of image data. To deal with motion image data with such a large data size, it is common to compress the motion image data. The data compression is also useful to achieve a reduction in the apparatus size.

For example, when motion image data is stored on a storage medium such as a flash memory, a hard disk, or DVD, or when motion image data is transmitted via a network, the motion image data is compressed to reduce the data size thereof. An increase in quality of motion image data has been achieved in recent years, for example, by a HD (High Definition) technique. However, the result of the improvement in data quality is an increase in the data size. In view of the above, intensive research and development activities are being carried out to improve the compression ratio in the compression of motion image data and minimize the degradation in image quality that occurs when image data is reproduced by decompressing the compressed image data.

A known method of compressing motion image data is to decimate pixels included in each frame of motion image data. This method is referred to as spatial decimation. Another method is to decimate frames (the frame rate is reduced as a result of frame decimation). This method is referred to as temporal decimation.

By performing such data conversion, the data size can be reduced and thus it becomes possible to efficiently store data on storage medium or transmit data via a network. However, compression of data causes degradation in image quality. That is, data reproduced from compressed image data is not as good as the original data. The problem with degradation in image quality is serious, in particular, when original data is of a high-resolution image.

A wide variety of techniques have been proposed to reduce such degradation in image quality. For example, Japanese Unexamined Patent Application Publication No. 2003-169284 discloses an image compression technique in which parameters are set based on information indicating the brightness of an image, and a compression mode is switched depending on the brightness of the image. Japanese Unexamined Patent Application Publication No. 2002-27466 discloses an image compression technique in which a screen is divided into a plurality of regions, and an optimum compression mode is determined for each region.

SUMMARY OF THE INVENTION

However, the known techniques to improve the data quality by selecting an optimum compression mode based on various characteristics detected from image data cannot sufficiently suppress degradation in image quality due to compression/decompression of image data. In particular, image data acquired using a single-plate solid-state color image sensor has problems that occur when the image data is demosaiced by performing an interpolation process using color information of neighboring pixels to reproduce a complete set of color components for each pixel, as described below.

(1) When a color mosaic signal output from the single-plate solid-state color image sensor is demosaiced, there is a possibility that color interpolation is not correctly performed in an edge area, and incorrect interpolation causes a false color.

(2) When a color mosaic signal output from the single-plate solid-state color image sensor is demosaiced, color interpolation filtering causes a reduction in a spatial frequency band.

(3) When a decimated image signal is perceived by a human viewer, the signal is temporally integrated by a vision system of the human viewer. The temporal integration causes an effect similar to that caused by a spatial low-pass filter.

In the conventional image pickup apparatus using the single-plate solid-state color image sensor, when an image signal having problems described in (1) and (2) with the reduction in the spatial frequency band and the generation of false colors is compressed, the problem described in (3) occurs. Thus, an image finally perceived by a human viewer has a spatial frequency band that is smaller than that of the original signal.

In view of the above, the present invention provides a method and apparatus for converting motion image data output from a single-plate solid-state color image sensor and a method and apparatus for reproducing motion image data such that motion image data is converted and inverse-converted while maintaining high image quality without causing significant reduction in the spatial frequency band even when the motion image data is compressed by a high compression ratio using the characteristics of human visual sense.

More specifically, a motion image data conversion apparatus according to an embodiment of the present invention includes an input unit configured to input motion image data in the form of color mosaic image data each pixel of which has single-color component data, and a spatial decimator configured to input motion image data from the input unit and perform a spatial decimation process separately on each color component data of the color mosaic image data, wherein the spatial decimator selects one or more representative values for each color component data of the color mosaic image data and produces spatially decimated data composed of selected representative values.

In the representative value selection process for each color component data of the color mosaic image data, the spatial decimator may set sample points, at which to select representative values of respective color component data, at different positions depending on the color components, and may employ pixel values at the sample points as the representative values.

In the representative value selection process for each color component data of the color mosaic image data, if no data of a color component to be processed is defined at a pixel position corresponding to a sample point of interest at which to acquire a representative value, the spatial decimator calculates the pixel value at the sample point of interest by performing an interpolation process using pixel values of neighboring pixels having color component data of the same color as the color to be acquired at the sample point of interest, and the spatial decimator may employ the calculated pixel value as the representative value.

In the representative value selection process for each color component data of the color mosaic image data, the spatial decimator may set sample points at which to select representative values at different positions depending on pixel lines, and perform the spatial decimation process in different phases depending on pixel lines.

The motion image data conversion apparatus may further include a block divider configured to receive motion image data from the input unit and divide the received motion image data into blocks on a frame-by-frame basis, and the spatial decimator may receive block data from the block divider and perform the representative value selection process on a block-by-block basis.

The motion image data conversion apparatus may further include a motion detector configured to detect the amount of motion of a subject in each of the blocks generated by the block divider, and the spatial decimator may perform the spatial decimation process in a mode determined based on the motion information detected by the motion detector.

In the motion image data conversion apparatus, the motion detector may detect a motion vector based on a comparison between different frames of the motion image data.

In the motion image data conversion apparatus, the spatial decimator may perform the spatial decimation process in a spatial decimation direction determined based on the motion information detected by the motion detector.

The motion image data conversion apparatus may further include a temporal decimator, and both the spatial decimation process and a temporal decimation process may be performed or one of the spatial decimation process or the temporal decimation process may be selectively performed, according to the motion information detected by the motion detector.

The motion image data conversion apparatus may further include a demosacing unit configured to generate a signal of each color component based on the color mosaic image data, and when the amount of interblock motion detected by the motion detector is equal to or less than a predetermined value, a demosaic process and a temporal decimation process may be performed without performing the spatial decimation process.

The motion image data conversion apparatus may further include a single-plate color image sensor, and the block divider may receive image data output from the single-plate color image sensor.

A motion image data reproducing apparatus for reproducing motion image data from converted motion image data, according to an embodiment of the present invention, includes a spatial decompression unit configured to receive spatially-decimated data of each block of each frame of the converted motion image data and decompress the received data separately for each color component, wherein the spatial decompression unit performs the decompression process in different phases depending on the color of the color component data.

In this motion image data reproducing apparatus, the spatial decompression unit may perform the spatial decompression process in different phases depending on pixel lines.

The motion image data reproducing apparatus may further include a temporal decompression unit configured to perform a temporal decompression process, and both the spatial decompression process and the temporal decompression process may be performed or one of the spatial decompression process or the temporal decompression process may be selectively performed.

The motion image data reproducing apparatus may receive decimation mode information indicating a decimation mode of each block, and may perform both the spatial decompression process and the temporal decompression process or may selectively perform one of the spatial decompression process and the temporal decompression process, according to the decimation mode information.

In the motion image data reproducing apparatus, the spatial decompression unit may perform the spatial decompression process according to a spatial decimation direction indicated by information included in the decimation mode information.

A method of converting motion image data according to an embodiment of the present invention includes the steps of inputting motion image data in the form of color mosaic image data each pixel of which has single-color component data, performing a spatial decimation process separately on each color component data of the motion image data of the color mosaic image data, wherein the spatial decimation step includes selecting one or more representative values for each color component data of the color mosaic image data and producing spatially decimated data composed of selected representative values.

A method of reproducing motion image data from converted motion image data, according to an embodiment of the present invention, includes the steps of receiving spatially-decimated data of each block of each frame of the converted motion image data, and spatially decompressing the spatially-decimated data for each color component data, wherein the spatially decompression is performed in different phases depending on the color component data.

In the present invention, as described above, the image data output from the single-plate solid-state color image sensor is in the form of a color mosaic image data composed of pixels each having a pixel value of one color assigned thereto depending on the position of the pixel. The color mosaic image data is spatially decimated on a block-by-block basis separately for each color component data. The spatial decimation is performed in a mode determined depending on the amount of motion of a block of interest so that spatial blurring and generation of false colors are suppressed thereby achieving high-quality data compression and decompression.

Further features and advantages of the present invention will become apparent from the following description of exemplary embodiments with reference to the attached drawings. Note that in the present description, the term "system" is used to describe a logical collection of a plurality of devices, and it is not necessarily required that the plurality of devices be disposed in a single case.

BRIEF DESCRIPTION OF THE DRAWINGS

FIG. 1 is a diagram showing an example of a color array used in a color filter;

FIG. 10 is a diagram showing an example of data in a pixel line (including pixels P1 to P8) of an image input to a motion image data conversion apparatus, for a series of frames (F1 to F8);

FIG. 11 is a diagram showing an example of data in a pixel line (including pixels P1 to P8) of a series of temporally successive frames (F1 to F8) reproduced by decompressing compressed data produced by performing the spatial decimation process shown in FIG. 9A on the input image shown in FIG. 10;

FIGS. 12A and 12B are diagrams showing spatial filters that simulate temporal integration that occurs when an image reproduced from spatially-decimated image data is viewed such that a moving part thereof is tracked;

FIGS. 19A to 19G are diagrams showing examples of manners in which representative points (sample points) are set by a spatial decimator in a motion image data converter of an image pickup apparatus;

FIGS. 20A to 20G are diagrams showing examples of manners in which representative points (sample points) are set by a spatial decimator in a motion image data converter of an image pickup apparatus;

FIG. 21 is a diagram of an example of a Bayer array, wherein two blocks thereof including a total of 4×8 elements are shown;

FIGS. 22A to 22D are diagrams showing a manner in which sampling points are set and a manner in which spatial decimation or spatial decompression is performed at the sampling points in a ¼ spatial decimation mode for two blocks each having a size of 4×4 pixels of R, G, and B signals of Bayer-array data;

FIGS. 23A to 23D are diagrams showing a manner in which sampling points are set and a manner in which spatial decimation or spatial decompression is performed at the sampling points in a ½ spatial decimation mode for two blocks each having a size of 4×4 pixels of R, G, and B signals of Bayer-array data;

FIG. 24 is a diagram of an example of a color array pattern arranged differently from a Bayer array pattern, for two blocks each having a size of 4×4 pixels;

FIGS. 25A to 25D are diagrams showing a manner in which sampling points are set and a manner in which spatial decimation or spatial decompression is performed at the sampling points in a ¼ spatial decimation mode for R, G, and B signals of motion image data including pixels arranged in the color array pattern shown in FIG. 24;

FIGS. 26A to 26D are diagrams showing a manner in which sampling points are set and a manner in which spatial decimation or spatial decompression is performed at the sampling points in a ½ spatial decimation mode for R, G, and B signals of motion image data including pixels arranged in the color array pattern shown in FIG. 24;

FIG. 28 is a diagram showing an example of a color filter pattern including a combination of complementary colors (yellow (Ye), magenta (Mg), and cyan (Cy)).

DESCRIPTION OF THE PREFERRED EMBODIMENTS

The method and apparatus for converting motion image data and the method and apparatus for reproducing motion image data are described below with reference to specific embodiments in conjunction with the accompanying drawings. The description will be provided in the following order.

(1) Basic structure of a motion image data conversion apparatus using the super resolution effect (2) Conversion of image data output from a single-plate solid-state color image sensor, and inverse conversion of image data (1) Basic Structure of a Motion Image Data Conversion Apparatus Using the Super Resolution Effect First, described is the basic structure of a motion image data conversion apparatus that compresses motion image data using the super resolution effect on which the present invention is based. The details of the basic structure are disclosed in Japanese Patent Application No. 2003-412501 filed by the present applicant. The motion image data conversion apparatus is configured to divide an image into small blocks and adaptively decimate pixels or frames depending on the moving speed of respective blocks thereby achieving compression of the motion image data.

Figure 2:
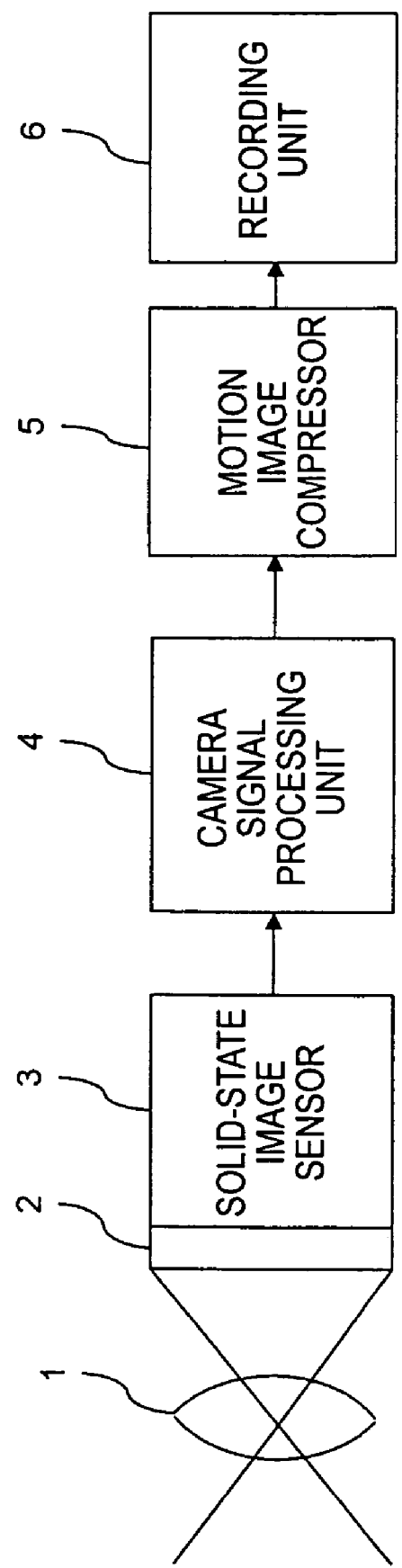
FIG. 2 is a block diagram showing an example of an image pickup apparatus including a single-plate solid-state color image sensor.
Figure 3:
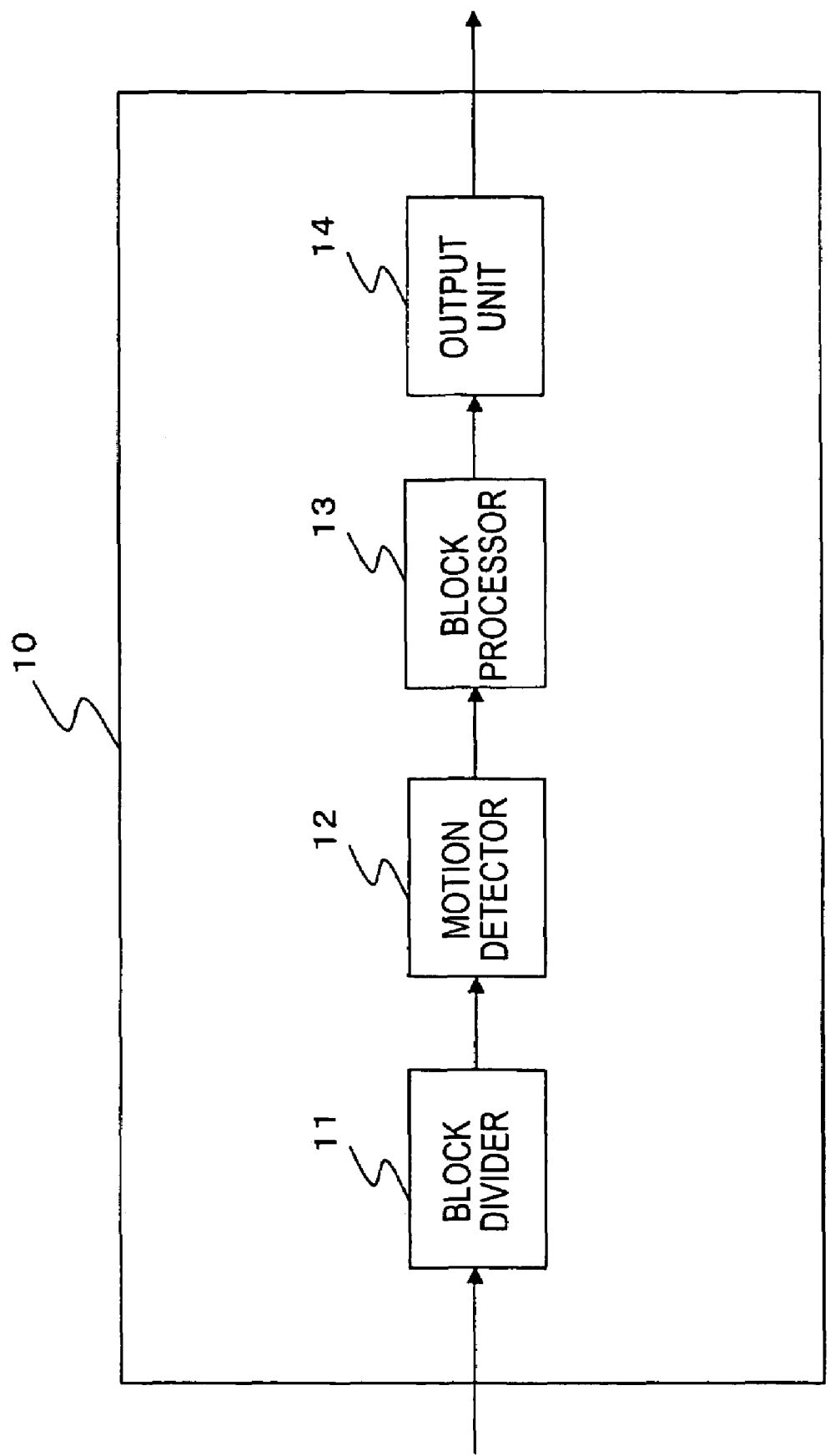
FIG. 3 is a block diagram showing a basic structure of a motion image data conversion apparatus that performs data conversion using a super resolution effect.

FIG. 3 shows an example of a structure of the motion image data conversion apparatus 10. This structure is disclosed in Japanese Patent Application No. 2003-412501. This motion image data conversion apparatus 10 is capable of converting motion image data using the super resolution effect such that the data size is reduced without causing degradation in image quality perceptible by viewers.

The super resolution effect refers to a visual effect that causes a viewer to perceive an image of a moving subject with a higher resolution than the actual resolution when the viewer views the image of the moving subject such that a particular point of the subject is tracked as the subject moves. This effect is based on the nature of visual sense that causes a viewer to perceive the sum of a plurality of images given in a particular period. This effect arises from the temporal integration function of the vision system of human viewers, which is known as a Bloch's law. A more detailed description thereof may be found, for example, in "Visual Information Handbook" (edited by the Vision Society of Japan, pp. 219-220). It is known that the Bloch's law holds for an integration period in a range from 25 ms to 100 ms, although the range varies depending on conditions such as the intensity of background light.

The motion image data conversion apparatus 10 shown in FIG. 3 is configured to perform motion image data conversion using the super resolution effect due to the human visual function of temporarily integrating visual stimulation, so that data is compressed without producing image quality degradation perceptible by viewers. The structure of the motion image data conversion apparatus 10 shown in FIG. 3 is described below.

A block divider 11 divides each frame of an input motion image into blocks each including a predetermined number of pixels and supplies the resultant blocks to a motion detector 12. The motion detector 12 detects the amount of motion of each block supplied from the block divider 11 and transmits data indicating the amount of motion together with the block to a block processor 13. The block processor 13 reduces data sizes of the blocks supplied from the motion detector 12 by performing a motion image conversion process (a compression process) on the block depending on the amount of motion. The block processor 13 supplies resultant block data with reduced data size to an output unit 14. The output unit 14 combines data of respective blocks with reduced data sizes supplied from the block processor 13 and outputs the resultant data in the form of stream data.

Figure 4:
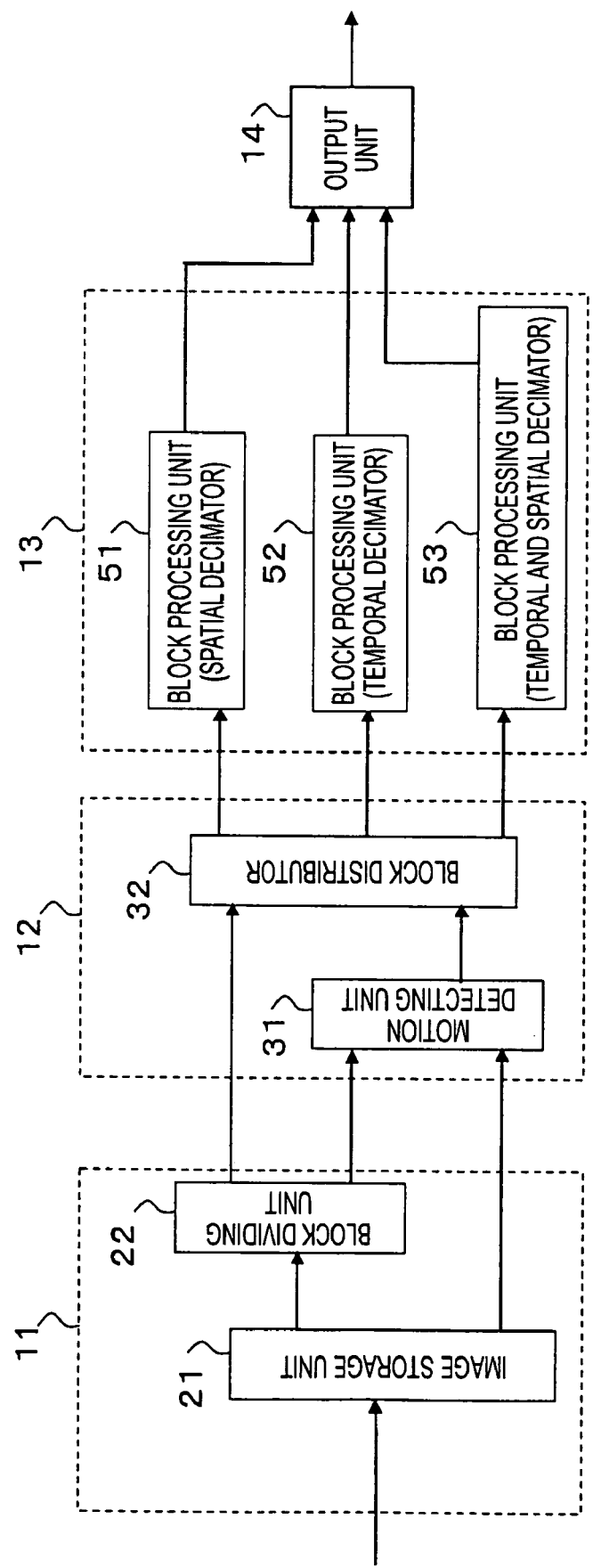
FIG. 4 is a block diagram showing details of the basic structure of the motion image data conversion apparatus that performs data conversion using the super resolution effect.

Referring to FIG. 4, details of the respective parts of the motion image data conversion apparatus 10 are described below. Each frame of the motion image input to the motion image data conversion apparatus 10 is supplied to an image storage unit 21 of the block divider 11. The image storage unit 21 stores the supplied frames. Each time N frames have been stored in the image storage unit 21 (where N is an integer), the image storage unit 21 supplies the N frames to a block dividing unit 22 and also supplies an M-th (M-thly stored) frame of the N frames to a motion detecting unit 31 of the motion detector 12. For example, N=4.

The block dividing unit 22 divides each of the N successive frames supplied from the image storage unit 21 into blocks with a predetermined size (for example, 8×8 pixels or 16×16 pixels) and outputs the blocks to a block distributor 32 of the motion detector 12. The block dividing unit 22 also supplies a P-th (P-thly stored) frame of the N frames stored in the image storage unit 21 to the motion detecting unit 31 of the motion detector 12. Note that the P-th frame is different from the M-th frame.

Next, the details of the motion detector 12 are described below. The motion detecting unit 31 of the motion detector 12 detects the motion vector of each block of the P-th frame supplied from the block dividing unit 22 of the block divider 11 by means of, for example, interframe block matching with respect to the M-th frame supplied from the image storage unit 21. The detected motion vector is supplied to the block distributor 32. The motion vector represents the amount of motion between frames in the horizontal direction (along the X axis) and the vertical direction (along the Y axis). To improve the accuracy of the detection of motion, the motion detecting unit 31 may enlarge the image and may detect the motion of the enlarged image.

Then the block distributor of the motion detector 12 receives N blocks (located at the same position of respective of N frames) at a time from the block dividing unit 22 and also receives the data indicating the motion of the block of the P-th frame, of the received N blocks, from the motion detecting unit 31. The block distributor 32 selects one of block processing units 51 to 53 of the block processor 13 depending on the amount of motion of the N blocks and supplies the received N blocks and the data indicating the amount of motion thereof to the selected one of block processing units 51 to 53.

More specifically, when the data received from the motion detecting unit 31 indicates that the motion in the horizontal (X) direction or the vertical (Y) direction per frame is equal to or greater than 2 pixels, the block distributor 32 supplies the N blocks received from the block dividing unit 22 and the motion data received from the motion detecting unit 31 to the block processing unit 51. In a case in which the motion per frame is less than 2 pixels but equal to or greater than 1 pixel in both horizontal and vertical directions, the block distributor 32 supplies the N blocks and the motion data to the block processing unit 53. When the motion has any other value, the block distributor 32 supplies the N blocks and the motion data to the block processing unit 52.

That is, the block distributor 32 determines an optimum frame rate and an optimum spatial resolution depending on the amount of motion indicated by the data supplied from the motion detector 12, and distributes the block image data to the block processing units 51 to 53 depending on the frame rate and the spatial resolution.

Now, the details of the block processor 13 are described below. As described above, the block processor 13 includes three block processing units 51 to 53. The block processing unit 51 performs pixel decimation (spatial decimation) on a total of N blocks (having motion equal to or greater than 2 pixels/frame in the horizontal or vertical direction) located at the same position of respective N frames supplied from the block distributor 32 of the motion detector 12, depending on the amount of motion indicated by the data received from the block distributor 32.

More specifically, in the case in which each block includes 4×4 pixels, when the amount of motion in the horizontal direction is equal to or greater than 2 pixels/frame, the block processing unit 51 selects one of the four pixels in each horizontal line and employs the pixel value of the selected pixel as the representative value for each line. In the example of FIG. 5B, of four pixels $P_{00}$ to $P_{30}$ in a horizontal line, only $P_{10}$ is employed as a representative value (sample point) and the other pixel values are discarded. Similarly, $P_{11}$ is employed as a representative value (sample point) of four pixels $P_{01}$ to $P_{31}$, $P_{12}$ is employed as a representative value (sample point) of four pixels $P_{02}$ to $P_{32}$, and $P_{13}$ is employed as a representative value (sample point) of four pixels $P_{03}$ to $P_{33}$.

In the case in which each block includes 4×4 pixels, when the amount of motion in the vertical direction is equal to or greater than 2 pixels/frame, one pixel value is employed as a representative value (sample point) of four pixels of each vertical column. In an example shown in FIG. 5C, $P_{01}$ is employed as a representative value (sample point) of four pixels $P_{00}$ to $P_{03}$, and the other pixel values are discarded. Similarly, $P_{11}$ is employed as a representative value (sample point) of four pixels $P_{10}$ to $P_{13}$, $P_{21}$ is employed as a representative value (sample point) of four pixels $P_{20}$ to $P_{23}$, and $P_{31}$ is employed as a representative value (sample point) of four pixels $P_{30}$ to $P_{33}$.

The block processing unit 51 performs the spatial decimation on each of a total of N blocks located at the same position of supplied successive N frames in the above-described manner. Thus the data size of each block is reduced by a factor of 4, and the total data size of 4 blocks is reduced by a factor of 4. The resultant data of 4 blocks with the data size reduced by the factor of 4 is supplied from the block processing unit 51 to the output unit 14.

Next, the operation performed by the block processing unit 52 shown in FIG. 4 is described below. The block processing unit 52 shown in FIG. 4 performs frame decimation (temporal decimation) on a total of N blocks (having motion less than 1 pixel/frame in both horizontal and vertical directions) located at the same position of successive N frames supplied from the block distributor 32 of the motion detector 12.

Figure 6:
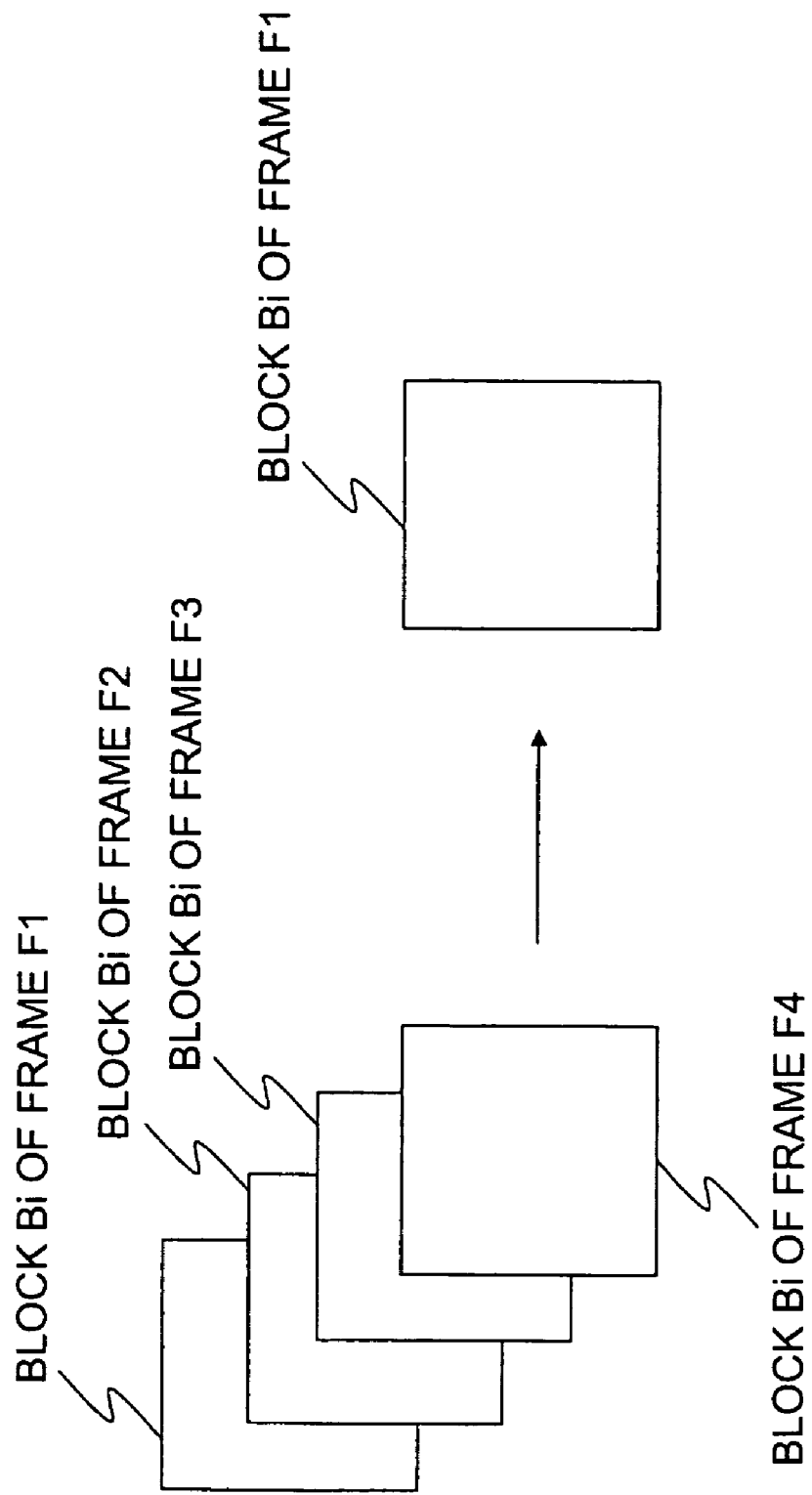
FIG. 6 is a diagram showing a process performed by a block processing unit of a motion image data conversion apparatus.

More specifically, as shown in FIG. 6, the block processing unit 52 performs decimation such that four blocks Bi at the same position of respective four successive frames F1 to F4 are decimated into one block selected from these four blocks (block Bi of frame F1 is selected in the example shown in FIG. 6). The resultant data of the four blocks whose total data size was reduced to ¼ of the original total data size via the temporal decimation is supplied from the block processing unit 52 to the output unit 14 (that is, data of one block is supplied). The image data of the selected one block is used as representative data for blocks of respective four frames.

The block processing unit 53 performs pixel decimation (spatial decimation) and frame decimation (temporal decimation) on a total of N blocks (having motion equal to or greater than 1 pixel/frame but less than 2 pixels/frame in both horizontal and vertical directions) located at the same position of successive N frames supplied from the block distributor 32 of the motion detector 12.

In the decimation process performed by the block processing unit 53, unlike the decimation process performed by the block processing unit 51, when the motion in the vertical direction is equal to or greater than 1 pixel/frame but less than 2 pixels/frame, if each block includes 4×4 pixels as shown in FIG. 7A, the block processing unit 53 selects one of the four pixels in each horizontal line and employs the pixel value of the selected pixel as the representative value for each line as shown in FIG. 7B. In the example shown in FIG. 7B, $P_{00}$ and $P_{20}$ are employed as representative values (sample points) of four pixels $P_{00}$ to $P_{30}$ in a horizontal line, and the other pixel values are discarded. Similarly, $P_{01}$ and $P_{21}$ are employed as representative values (sample points) of four pixels $P_{01}$ to $P_{31}$, $P_{02}$ and $P_{22}$ are employed as representative values (sample points) of four pixels $P_{02}$ to $P_{31}$, and $P_{03}$ and $P_{23}$ are employed as representative values (sample points) of four pixels $P_{03}$ to $P_{33}$.

In a case in which the motion in the vertical direction is equal to or greater than 1 pixel/frame but less than 2 pixels/frame, if each block includes 4×4 pixels as shown in FIG. 7A, the block processing unit 53 selects two pixel values as representative values for four pixels in each vertical column. In the example shown in FIG. 7C, $P_{00}$ and $P_{02}$ are employed as representative values (sample points) of four pixels $P_{00}$ to $P_{03}$ in a vertical line, and the other pixel values are discarded. Similarly, $P_{10}$ and $P_{12}$ are employed as representative values (sample points) of four pixels $P_{10}$ to $P_{13}$, $P_{20}$ and $P_{22}$ are employed as representative values (sample points) of four pixels $P_{20}$ to $P_{23}$, and $P_{30}$ and $P_{32}$ are employed as representative values (sample points) of four pixels $P_{30}$ to $P_{33}$.

The block processing unit 53 also performs a frame decimation process. More specifically, two blocks are selected from four blocks located at the same position of respective four successive frames F1 to F4, and the four blocks are decimated into two selected blocks thereby decimating frames. That is, in the frame decimation process performed by the block processing unit 53, unlike the decimation process performed by the block processing unit 52, two blocks (blocks of frames F1 and F3, in the example shown in FIG. 8) are selected from a total of four blocks Bi located at the same position of respective four successive frames F1 to F4, and the four blocks are decimated into two selected blocks thereby decimating frames (by a factor of 2). Image data of the selected two blocks are used as sample point data for the four frames. More specifically, because eight sample points have already been selected in the spatial decimation described above with reference to FIG. 7, sixteen sample points are selected from the two blocks and these sixteen sample points are used as sample point data for the four frames.

As a result of the decimation performed by the block processing unit 53 on the supplied four blocks, the data size is reduced by a factor of 2 via the spatial decimation and also reduced by a factor of 2 via the temporal decimation, and thus, the total data size of four blocks is reduced to ¼ (=½×½) of the original data size. The resultant data of 4 blocks with the data size reduced by the factor of 4 is supplied from the block processing unit 53 to the output unit 14.

The output unit 14 combines data of respective N blocks with reduced data sizes supplied from the block processing units 51 to 53 of the block processor 13 and outputs the resultant data in the form of stream data.

The motion image data conversion apparatus described above has been disclosed in Japanese Patent Application No. 2003-412501 filed by the present applicant. In this motion image data conversion apparatus, taking into account the characteristics of human visual sense, an optimum frame rate and spatial resolution are determined depending on the amount of motion for each small block of a motion image, and data is compressed in accordance with the determined frame rate and spatial resolution. That is, the data size is reduced by performing spatial decimation in the same direction as the moving direction, depending on the amount of motion and taking into account the super resolution effect that arises from the temporal integration function of the human vision system and that occurs when a moving subject is tacked by a human eye.

Figure 9A:
FIGS. 9A and 9B are diagrams showing examples of spatial decimation processes performed by a motion image data conversion apparatus.
Figure 9B:
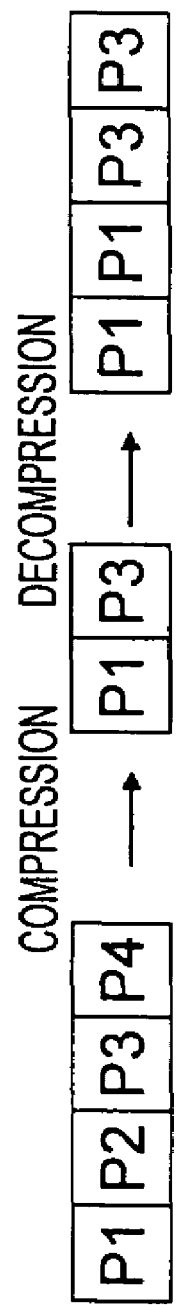

An example of a process of reproducing image data from compressed data produced via the decimation process performed by the above-described apparatus, and displaying a motion image of a subject according to the reproduced image data such that a human viewer can view the motion image. FIGS. 9A and 9B show examples of spatial decimation processes performed by the motion image data conversion apparatus described above. FIG. 9A shows a process of compressing the data size by a factor of 4 when the image has a large motion. When the motion is in the horizontal direction, one pixel (P2) is selected as a representative pixel of four successive pixels (P1 to P4) located in a horizontal line. On the other hand, in a receiving apparatus, decompressing is performed by assigning the representative value (P2) to the four successive pixels in the horizontal line. FIG. 9B shows a process of compressing the data size by a factor of 2 when the motion is not very large. When the motion is in the horizontal direction, one pixel (P1) is selected as a representative pixel of two successive pixels (P1 and P2) located in a horizontal line. On the other hand, in the receiving apparatus, decompressing is performed by assigning the representative value (P1) to the two successive pixels in the horizontal line.

As described below, a particular phenomenon occurs when a human viewer views an image of a moving subject included in a motion image reproduced from block data produced via the spatial decimation shown in FIG. 9A. FIG. 10 shows an example of one of pixel lines (including pixels P1 to P8) of each of temporarily successive frames (F1 to F8) of an original image input to the motion image data conversion apparatus. That is, image data that has not yet been subjected to the spatial decimation is shown for one of many pixel lines of a series of eight frames.

Herein, it is assumed that the image includes a subject (A to H and T to Z) moving to the right at a speed of 1 pixel/frame. If the subject is viewed such that a part denoted by An is tracked, the tracking point moves to the right (at a speed of 1 pixel/frame) as the part A moves. If a vision system has an integration time for incident light corresponding to eight frames, the signals from a frame F1 to a frame FB are integrated. Because the part An is always located at the tracking point, the image of the part An is perceived as a result of the integration. This is also true for subjects (B to H and T to Z) located to the right or left of the part An and moving at the same speed. Thus, clear images of subjects (A to H and T to Z) with no spatial blur are perceived by a viewer.

FIG. 11 shows pixels (P1 to P8) in one of lines of each of temporally successive frames (F1 to F8) reproduced by decompressing compressed data produced by performing the spatial decimation shown in FIG. 9A on the input image data shown in FIG. 10.

As shown in FIG. 9A, the spatial decimation is performed such that one pixel (P2) is selected from successive four pixels (P1 to P4) as a representative pixel of the four pixels.

On the other hand, the decompression is performed by filling the four pixels with the representative value. Thus, as shown in FIG. 11, the value of each pixel varies frame by frame. More specifically, in the first frame (F1), the pixel values of the pixels P1 to P4 are all given by the pixel value=B (FIG. 10) of the pixel P1 of the original image, and the pixel values of the pixels P5 to P8 are all given by the pixel value=F (FIG. 10) of the pixel P6 of the original image. In the second frame (F2), the pixel values of the pixels P1 to P4 are all given by the pixel value=A (FIG. 10) of the pixel P2 of the original image, and the pixel values of the pixels P5 to P8 are all given by the pixel value=E (FIG. 10) of the pixel P6 of the original image. The remaining pixel values are given in a similar manner, and thus a reproduced image is obtained.

If the respective frame images are viewed by a viewer such that a particular point is tracked by eyes of a viewer as described above with reference to FIG. 10, an image A' perceived at the tracking point by the viewer is given by the following equation.

$$A'=(1/8)(2Y+2Z+2A+2B)$$

Similarly, an image B' perceived by the viewer, at an adjacent pixel to the right of the tracking point, is given by the following equation.

$$B'=(1/8)(2Z+2A+2B+2C)$$

On the other hand, an image Z' perceived by the viewer, at an adjacent pixel to the left of the tracking point, is given by the following equation.

$$Z'=(1/8)(2X+2Y+2Z+2A)$$

Figures 12A, 12B:
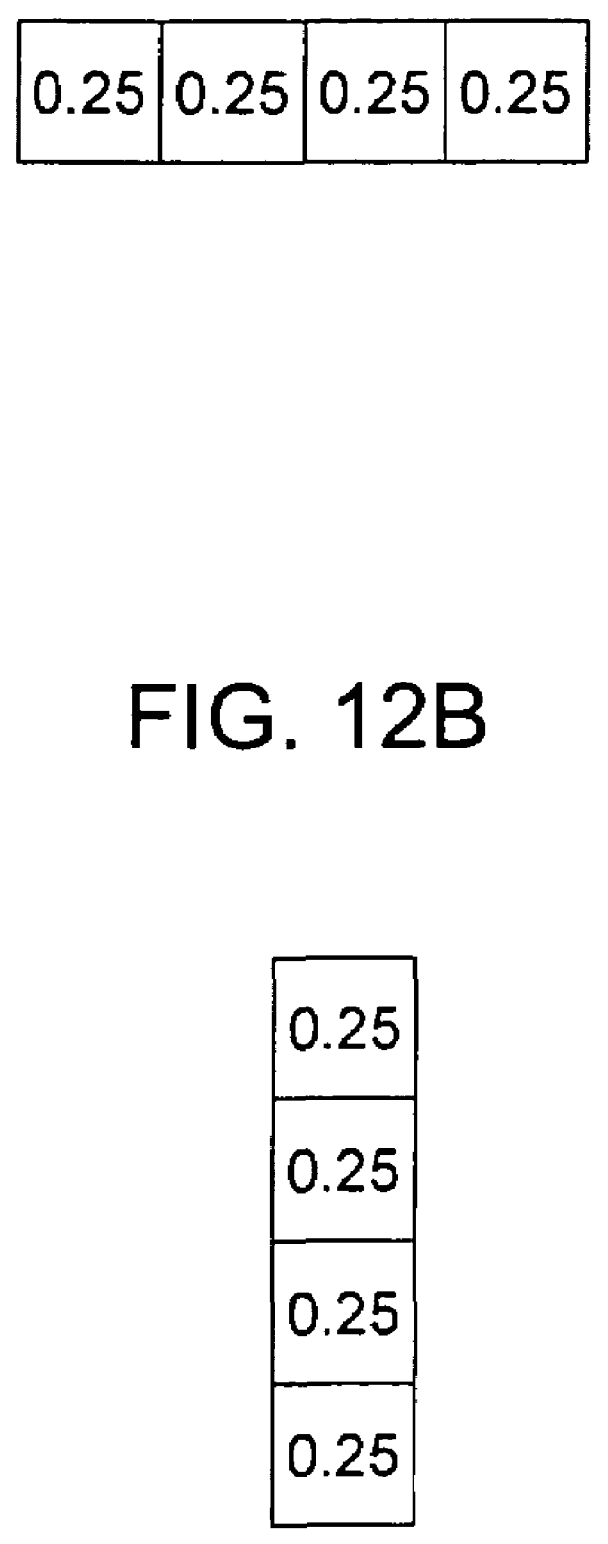

Thus, if image data is subjected to the spatial decimation by the above-described motion image data conversion apparatus (disclosed in the Japanese Patent Application No. 2003-412501), and if a moving point of an image reproduced from that image data is tacked, the temporal integration by human visual sense causes the image to have a change similar to a change that occurs if the image data is passed through a spatial filter having coefficients shown in FIG. 12A. In the example shown in FIG. 11, the subject is assumed to move in the horizontal direction. If the subject moves in the vertical direction, the image has a change similar to a change that occurs if the image data is passed through a spatial filter having coefficients shown in FIG. 12B.

Herein it is assumed that the temporal integration by the human visual sense system occurs in the form of a simple summation for a period with a particular length. However, the mechanism of the human visual sense has not been completely elucidated, and the temporal integration by the human visual sense system is not necessarily completely equivalent to that the spatial filter shown in FIG. 12. Anyway, the data compression based on the spatial decimation can cause the image to have some spatial blur when it is viewed by a human viewer with a visual sense system having characteristics associated with temporal integration.

(2) Conversion of Image Data Output from a Single-Plate Solid-State Color Image Sensor, and Inverse Conversion of Image Data Now, a process of producing compressed data by converting motion image data output from the single-plate solid-state color image sensor, and a process of reproducing image data from the compressed data are described below.

Figure 13:
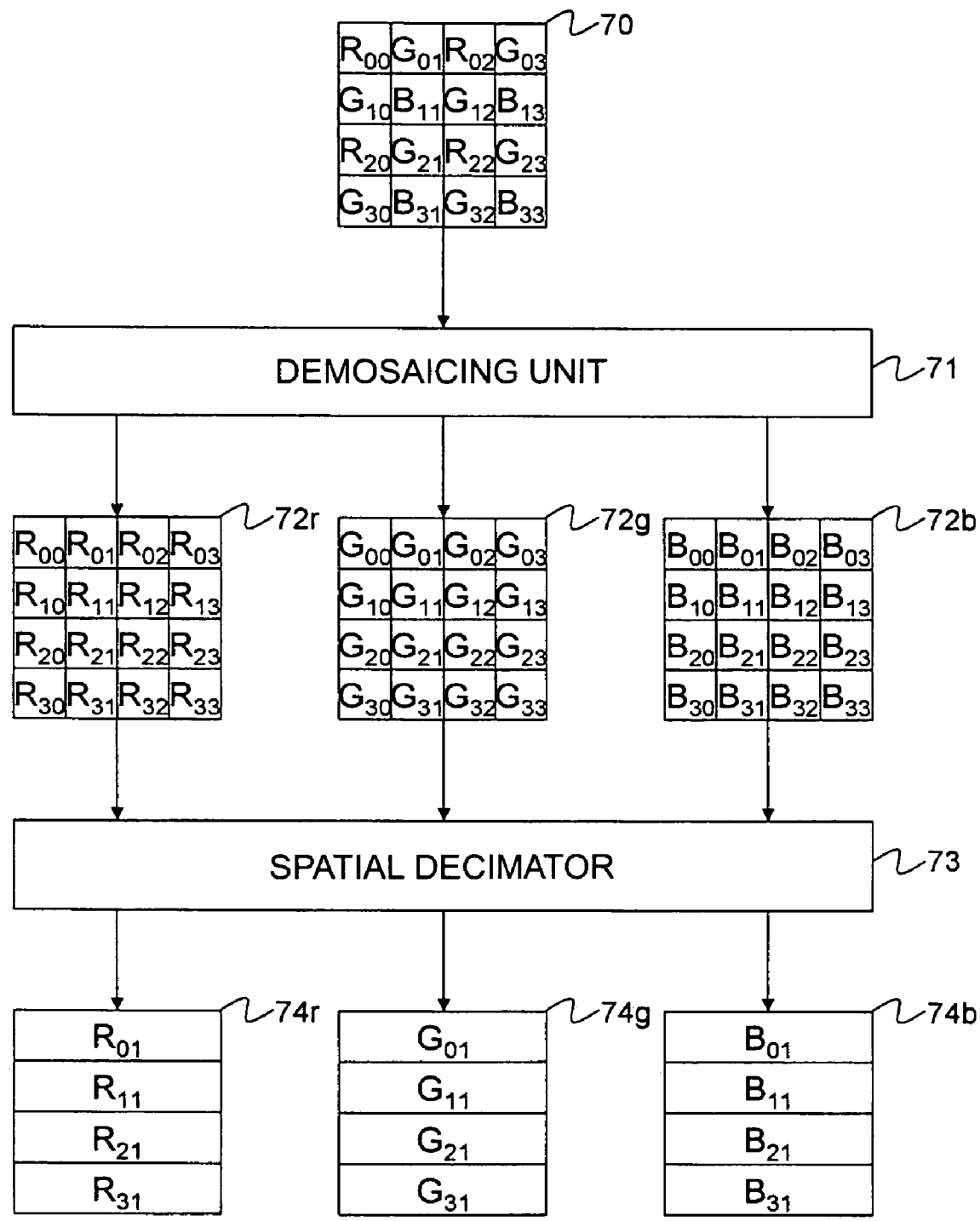
FIG. 13 is a diagram showing a process of producing compressed data from an image output from a single-plate solid-state color image sensor.

First, referring to FIG. 13, a process of generating compressed data from an image supplied from a single-plate solid-state color image sensor is described. In the single-plate solid-state color image sensor, an image is sensed via primary-color filters arranged, for example, in the form of a Bayer array (FIG. 1) such that each pixel senses only a signal component with a particular wavelength assigned to the pixel, that is, each pixel acquires color-component data with the particular wavelength. In the case in which a single-plate solid-state color image sensor with a Bayer-array filter is used, an image 70 output from the solid-state image sensor is in the form of a color mosaic image in which each pixel has only information of one of R, G, and B colors.

A demosaicing unit 71 reproduces all R, G, and B color components for each pixel by means of color interpolation.

First, a process performed by the demosaicing unit 71 to reproduce a G signal is described. In the Bayer array, the G signal is acquired at only particular pixels arranged in a checkerboard-like pattern and no G signal is acquired at the other pixels. For pixels (such as $G_{11}$) having no G signal in the image data 70 output from the solid-state image sensor, G signals are generated from G signals of adjacent pixels by means of interpolation. More specifically, for example, the G signal of the pixel $G_{11}$ is reproduced according to the following equation.

$$G_{11}=(1/4)(G_{01}+G_{21}+G_{10}+G_{12})$$

On the other hand, the R and B signals are reproduced as follows. In the Bayer array, R signals, and also B signals, are output every two pixels. In the example shown in FIG. 13, no B signals exist in the top pixel line of the image data 70 output from the solid-state image sensor, although R signals exit. On the other hand, in the second pixel line, no R signals exist although B signals exist.

In each pixel line in which either R or B signals exist, R or B signals are acquired every two pixels. In the image data 70 output from the solid-state image sensor, for each pixel which is not of the R color, such as $R_{01}$ (or for each pixel which is not of the B color, such as $B_{12}$) but which is located in a line in which there are pixels of the R color (or of the B color), the R signal thereof is produced from R signals (or the B signals) of adjacent R pixels (B pixels) in that line by means of interpolation. For example, the R signal of the pixel $R_{01}$ and the B signal of the $B_{12}$ are respectively produced in accordance with the following equations.

$$R_{01}=(1/2)(R_{00}+R_{02})$$

$$B_{12}=(1/2)(B_{11}+B_{13})$$

Similarly, for each pixel which is not of the R color, such as $R_{10}$ (or for each pixel which is not of the B color, such as $B_{21}$) but which is located in a column in which there are pixels of the R color (or of the B color), the R signal thereof is produced from R signals (or the B signals) of adjacent R pixels (B pixels) in that column by means of interpolation. For example, the R signal of the pixel $R_{10}$ and the B signal of the $B_{21}$ are respectively produced in accordance with the following equations.

$$R_{10}=(1/2)(R_{00}+R_{20})$$

$$B_{21}=(1/2)(B_{11}+B_{31})$$

For each pixel which is not of the R color, such as $R_{11}$ (or for each pixel which is not of the B color, such as $B_{22}$) and which has no neighboring pixels of the R color (B color) in the same line and the same column, the R signal (B signal) thereof is calculated according to the following equation.

$$R_{11}=(1/4)(R_{00}+R_{02}+R_{20}+R_{22})$$

$$B_{22}=(1/4)(B_{11}+B_{13}+B_{31}+B_{33})$$

The demosaicing unit 71 performs the color interpolation process as described above, and outputs a R signal 72*r*, a G signal 72*g*, and a B signal 72*b* for each of all pixels. Note that the method of the interpolation is not limited to the example described above, but the color interpolation may be performed in different manners using correlations among color signals.

When a block including the R signal 72*r*, the G signal 72*g*, and the B signal 72*b* output from the demosaicing unit 71 moves in the horizontal direction at a speed equal to or greater than a predetermined value, the spatial decimator 73 performs the spatial decimation as shown in FIG. 9A. As a result of the spatial decimation, the pixel values of successive four pixels (for example, $R_{00}$ to $R_{03}$) in each pixel line are expressed by one representative pixel value (for example, $R_{01}$), and thus the data size is reduced.

The compressed R, G, and B signals 74*r*, 74*g*, and 74*b* output in the above-described manner are subjected to the decompression process as shown in FIG. 9A, and an image is displayed in accordance with the resultant decompressed signals. If the displayed image is viewed such that a particular point is tracked as the point moves, frequency components of the original signals are reproduced by the super resolution effect. However, the reproduced signals include a spatial blur as described earlier. Thus, in the image pickup apparatus using the single-plate solid-state color image sensor, if the spatial decimation is performed on the demosaic-processed color signals, an image subjected to the spatial filtering in the demosaic processing and further subjected to the spatial filtering caused by the temporal integration by the vision system of the human viewer is perceived by the viewer. In the case in which an edge or the like of a subject is located at a pixel which is neither of the R signal nor of the B signal, when the R and B signals of that pixel are calculated from R or B signals of adjacent pixels that are not located on the edge, there is a possibility that a color reproduced from colors of adjacent pixels by means of interpolation in the demosaic processing is very different from a true color (that is, there is a possibility that a false color is reproduced). If the spatial decimation is performed on an image including such a false color, an image perceived by the viewer includes the false color.

An image pickup apparatus and a motion image data conversion apparatus according to an embodiment of the present invention are described below with reference to drawings. First, referring to FIGS. 14 and 15, a motion image processing system according to an embodiment of the present invention is described.

Figure 14:
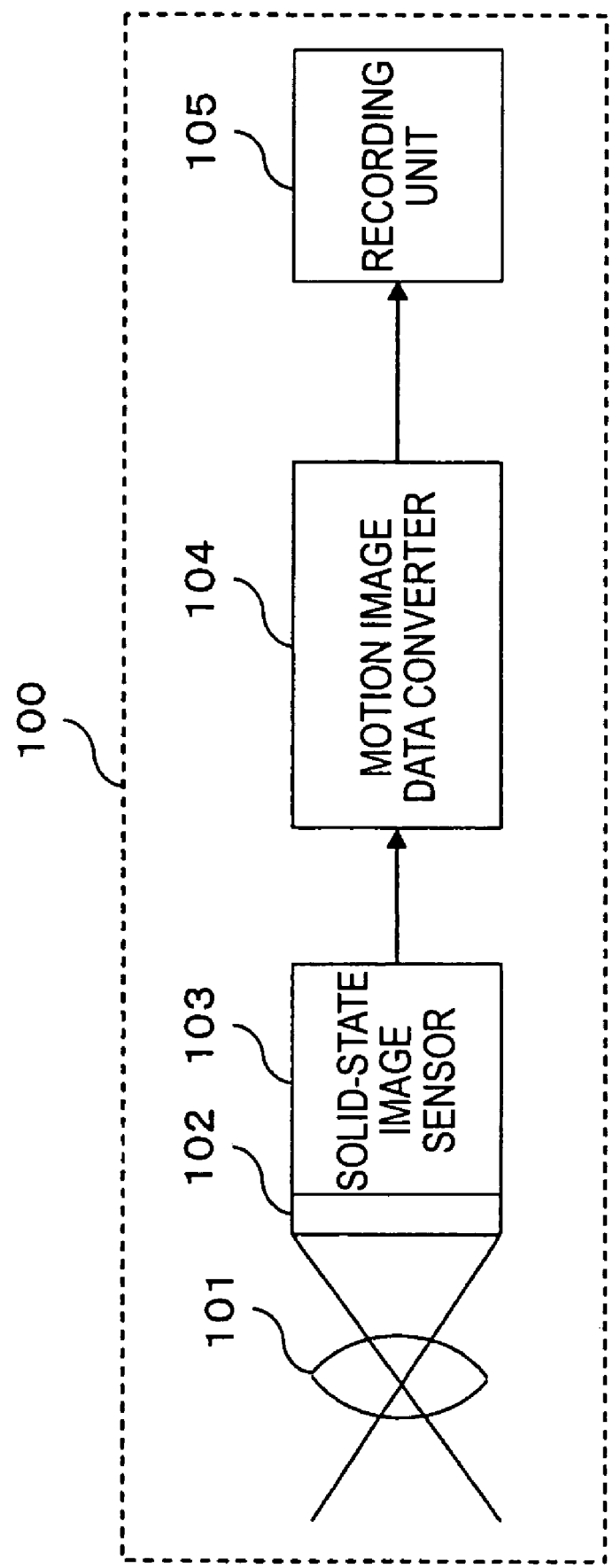
FIG. 14 is a diagram showing an image pickup apparatus according to an embodiment of the present invention.

FIG. 14 shows an image pickup apparatus 100 according to an embodiment of the present invention. The image pickup apparatus 100 includes a solid-state image sensor 103 that detects incident light and outputs an image signal, a color filter 102 stuck on the solid-state image sensor 103, an imaging system including an optical lens 101 that forms an image on the solid-state image sensor 103, a motion image data converter 104 that adaptively processes the image signal output from the solid-state image sensor 103, and a recording unit 105 that records a converted motion image signal on a recording medium.

The solid-state image sensor 103 is an image sensors such as a CCD (Charge Coupled Device) image sensor or a CMOS (Complementary Metal Oxide Semiconductor) image sensor, which outputs an image signal obtained by converting an optical image formed by light incident on the image sensor into an electrical signal.

The color filter 102 is a thin film that allows only light with particular wavelengths, depending on the positions of the respective pixels, to pass through and reach the pixels of the solid-state image sensor 103. More specifically, as described earlier with reference to FIG. 1, the color filter 102 includes primary-color filter components that allow light with wavelengths respectively corresponding to red (R), green (G) and blue (B). Although in the present embodiment described herein, the color filter 102 includes primary-color filter components of R, G, and B, the color filter 102 may be formed to include other color filter components that allow light with wavelengths corresponding to complementary colors such as yellow, magenta, and cyan to pass through.

The motion image data converter 104 performs the decimation process or the demosaicing process, adaptively depending on the amount of motion, on the color mosaic image signal output from the solid-state image sensor 103, for each block, thereby converting the image signal into a high-quality motion image signal with a reduced data size. The details of the motion image data converter 104 will be described later.

The recording unit 105 records the signal output from the motion image data converter 104 on a recording medium such as a video tape or a DVD (Digital Versatile Disk) disk. There is no particular restriction on the type of the recording medium, as long as the recording medium is capable of recording motion image data. The recording unit 105 is not necessarily needed. When there is no recording unit 105, the signal output from the motion image data converter 104 may be supplied to a playback unit for playing back the signal or may be output over a network via a network interface.

Figure 15:
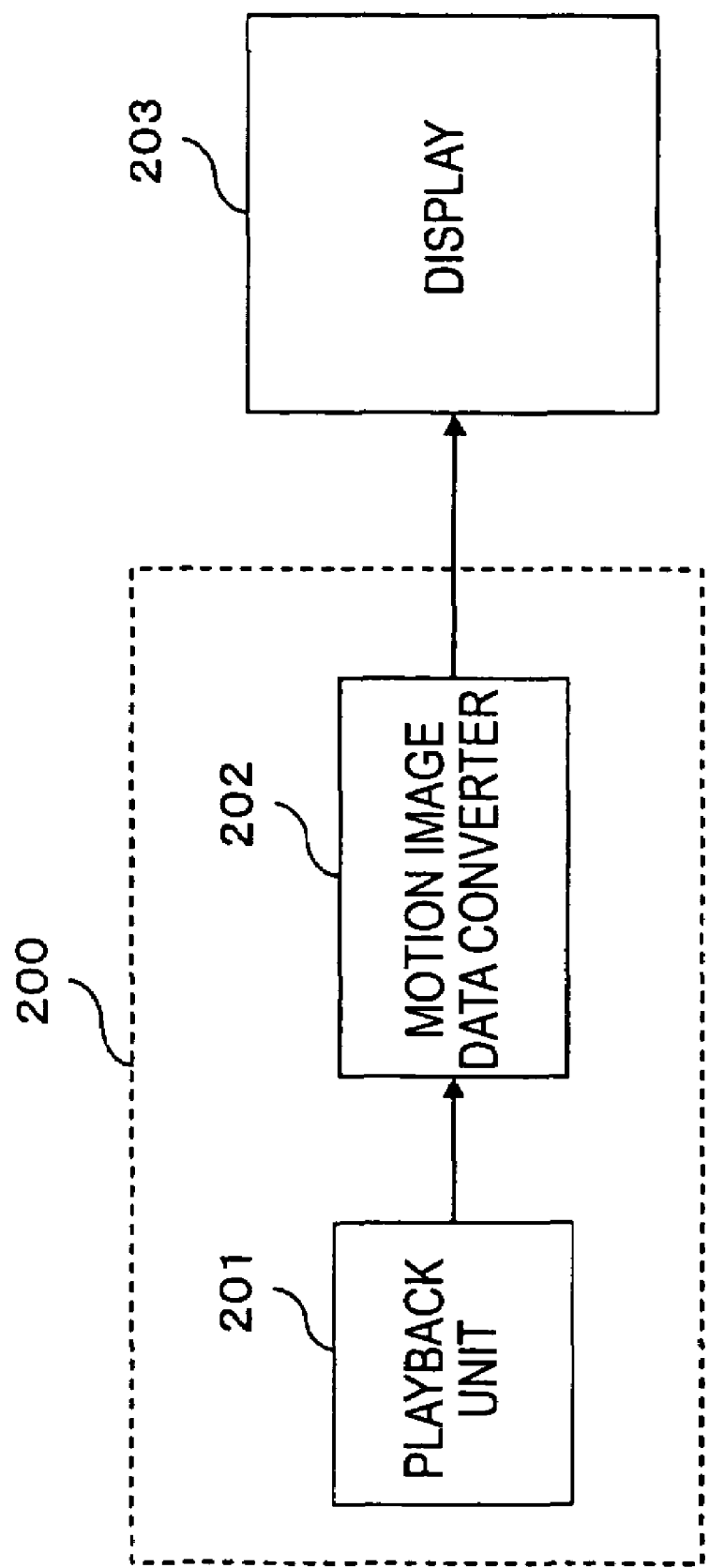
FIG. 15 is a diagram showing a playback apparatus for playing back a motion image taken by the image pickup apparatus shown in FIG. 14 and recorded on a recording medium, and also showing a display that displays the played-back motion image.

FIG. 15 shows a playback apparatus 200 for playing back a motion image recorded, by the image pickup apparatus 100, on the image pickup apparatus 100 shown in FIG. 14, and a display 203 for displaying a played-back motion image. The playback apparatus 200 includes a playback unit 201 for reading motion image data from a recording medium, and a motion image data converter 202.

The playback unit 201 reads data from a recording medium such as a video tape or a DVD disk. In the present embodiment, the data is recorded on the recording medium by the recording unit 105 of the image pickup apparatus 100. Instead of reading data from a recording medium by the playback unit 201, data may be input in another manner. For example, data output from the image pickup apparatus 100 may be directly input or data may be input via an external network by using a wireless transmission unit or the like (not shown).

The motion image data converter 202 performs a spatial decompression process on the data read from the recording medium or input from the outside, for each block in an adaptive manner according to the decimation information attached to the data thereby reproducing motion image data without producing significant image quality degradation perceivable by a viewer. The details of the motion image data converter 202 will be described later.

The display 203 displays an image in accordance with the motion image signal received from the playback apparatus 200. There is not particular restriction on the type or the light emission mechanism of the display 203. For example, a LCD (Liquid Crystal Display), a PDP (Plasma Display Panel) or a CRT (Cathode Ray Tube) may be used. As described above, in the present image sensing apparatus, the image data output from the image sensor is converted in an optimum mode determined taking into account the super resolution effect arising from the temporal integration of a plurality of successive frames, which occurs in a vision system of a human viewer, thereby achieving a motion image having minimized degradation in image quality. To obtain the super resolution effect, the display 203 has to display the image at a frame rate such that a particular number of frames are displayed within a period of time in which the temporal integration occurs in a vision sense system of a human viewer.

Figure 16:
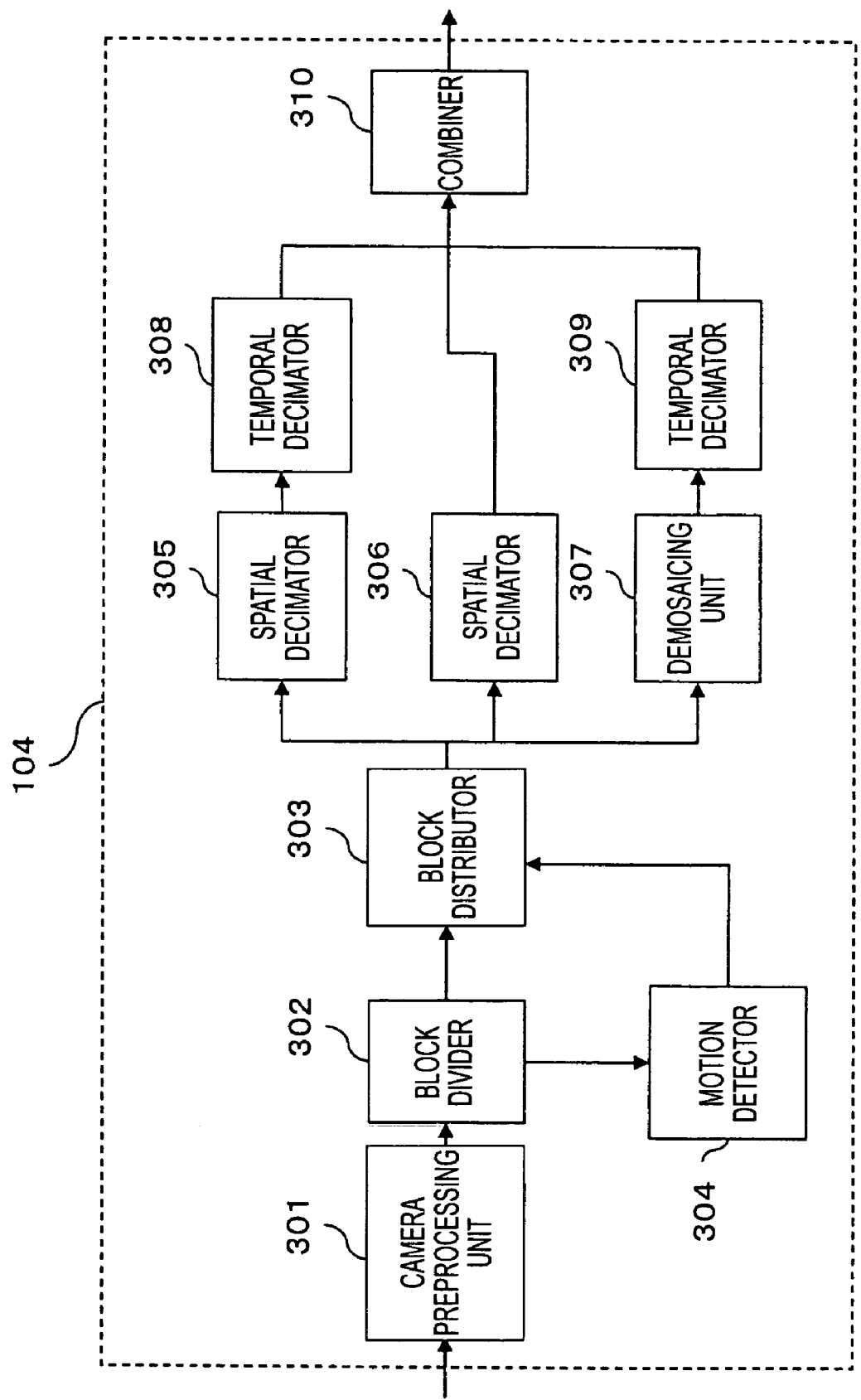
FIG. 16 is a block diagram showing the details of a motion image data converter of the image pickup apparatus shown in FIG. 14.

Referring to FIG. 16, the motion image data converter 104 of the image pickup apparatus 100 shown in FIG. 14 is described in further detail below. A color mosaic image signal output from the solid-state image sensor 103 is input on a frame-by-frame basis to the motion image data converter 104. In the motion image data converter 104, a camera preprocessing unit 301 performs preprocessing such as clipping or white balance correction on the color mosaic image signal. This preprocessing is performed before the demosaicing process.

After the preprocessing such as clipping and/or white balance correction is performed, the resultant image signal is input frame by frame to the block divider 302. The block divider 302 divides each received frame image into blocks with a predetermined size (including n×n pixels) and supplies the resultant block data on a block-by-block basis to a block distributor 303 and also to a motion detector 304. In the present embodiment, the block divider 302 divides each frame image into blocks with a size of 4×4 pixels (that is, n=4). That is, the block divider 302 receives, on a frame-by-frame basis, color mosaic motion image data each pixel of which has single-color component data subjected to the preprocessing such as clipping and/or white balance correction, and the block divider 302 divides each frame of the motion image data into blocks.

The motion detector 304 detects the amount of motion of a block of the current frame of the input image by comparing the block with a block of an image that is stored in an image memory and that is one or more frames before the current frame. The detected motion information is supplied to the block distributor 303 Because the block input to the motion detector 304 is in the form of the color mosaic image signal, there is a possibility that the amount of motion cannot be successfully determined by the block matching process. To avoid such a problem, the motion detector 304 may first perform demosaicing on the input block and the reference block by color interpolation, and then perform the block matching process. Note that the method of determining the amount of motion for each block is not limited to the block matching process, but any other method may be used if it is capable of determining the amount of motion for each block.

The block distributor 303 determines whether the spatial decimation should be performed on the current block, based on the amount of motion of each block notified by the motion detector 304. Note that only one of the horizontal and vertical components of the amount of motion of each block is employed as the criterion for the determination.

More specifically, the block distributor 303 supplies the present block to the first spatial decimator 305 when the amount of motion of the block per frame is equal to or greater than 1 pixel but less than 2 pixels, or to the second spatial decimator 305 when the amount of motion of the block per frame is equal to or greater than 2 pixels. In the other cases, that is, when the amount of motion of the block per frame is less than 1 pixel, the current block is supplied to the demosaicing unit 307. Note that the criterion for the determination is not limited to that employed herein, but other criteria may be used. When the spatial decimation is performed, the block distributor 303 also supplies information indicating the block decimation direction to the spatial decimator 395 or 306. Based on the motion information supplied from the motion detector 304, the block distributor 303 selects a greater one of the horizontal or vertical components of the motion and employs the selected horizontal or vertical direction as the block decimation direction.

The demosaicing unit 307 performs demosacing on the input block by the color interpolation. The demosacing process is similar to that performed by the demosaicing unit 71, described earlier with reference to FIG. 13. That is, for pixels having no R, G, or B pixel value, R, G, or B pixel values are calculated based on R, G, or B pixel values of adjacent pixels. The demosaicing unit 307 outputs the resultant R, G, and B signals of the block. The R, G, and B signals correspond respectively to the R signal 72r, the G signal 72g, and the B signal 72b shown in FIG. 13.

The demosaiced data output from the demosaicing unit 307 is input to a temporal decimator 309. The temporal decimator 309 performs a temporal decimation process on the demosaiced data. The temporal decimation process performed by the temporal decimator 309 is similar to that performed by the block processing unit 52 of the motion image data conversion apparatus, described earlier with reference to FIG. 4. More specifically, as described earlier with reference to FIG. 6, the temporal decimator 309 performs the temporal decimation process such that four blocks Bi at the same position of respective four successive frames F1 to F4 are decimated into one block selected from these four blocks (block Bi of frame F1 is selected in the example shown in FIG. 6). As a result of the temporal decimation process performed by the temporal decimator 309, the data size is reduced by a factor of 4.

The spatial decimator 305 or 306 performs the spatial decimation process separately on the respective color components of the color mosaic data.

The spatial decimator 306 performs the spatial decimation process on blocks whose motion is equal to or greater than 2 pixels/frame such that the number of pixels of each block is reduced by a factor of 4. More specifically, the spatial decimator 306 selects one pixel out of every four successive pixels located in the decimation direction indicated by the block decimation information supplied from the block distributor 303 and outputs the pixel value of the selected pixel as the representative value for the four pixels. In the present embodiment, the R signal, the G signal, and the B signal of the selected pixel are output as the representative values for the color mosaic image signal of the four pixels.

On the other hand, the spatial decimator 305 performs the spatial decimation process on blocks whose motion is equal to or greater than 1 pixel/frame but less than two pixels/frame such that the number of pixels of each block is reduced by a factor of 2. More specifically, the spatial decimator 306 selects one pixel out of every two successive pixels located in the decimation direction indicated by the block decimation information supplied from the block distributor 303 and outputs the pixel value of the selected pixel as the representative value for the two pixels. In the present embodiment, the R signal, the G signal, and the B signal of the selected pixel are output as the representative values for the color mosaic image signal of the two pixels. The operation of the spatial decimators 306 and 305 will be described in further detail later.

The data output from the spatial decimator 305 is input to a temporal decimator 308. The temporal decimator 308 performs a temporal decimation process on the spatially-decimated data. The temporal decimation process performed by the temporal decimator 308 is similar to that performed by the block processing unit 53 of the motion image data conversion apparatus, described earlier with reference to FIG. 4. More specifically, as described earlier with reference to FIG. 8, the temporal decimator 308 performs the temporal decimation process such that two blocks (blocks of frames F1 and F3, in the example shown in FIG. 8) are selected from a total of four blocks Bi located at the same position of respective four successive frames F1 to F4, and the four blocks are decimated into two selected blocks thereby decimating frames by a factor of 2. Image data of the selected two blocks are used as sample point data for the four frames.

Because, the data size is reduced by a factor of 2 as a result of the spatial decimation performed by the spatial decimator 305, and the data size is further reduced by a factor of 2 as a result of the temporal decimation performed by the temporal decimator 308, the data size is reduced by a factor of 4 in total.

A mixer 310 produces one frame of data by combining the decimated data obtained via the processes performed by the spatial decimator 305 and the temporal decimator 308, the decimated data obtained via the process performed by the spatial decimator 306, and the decimated data obtained via the process performed by the temporal decimator 309 on the demosaiced data output from the demosaicing unit 307, and the mixer 310 attaches decimation information indicating the block decimation mode to the resultant one frame of data. There is no particular restriction on the format of the data produced by the mixer 30, as long as the data includes information identifying the start of each block, information indicating the block decimation mode, and representative pixel values of each block.

Figure 17:
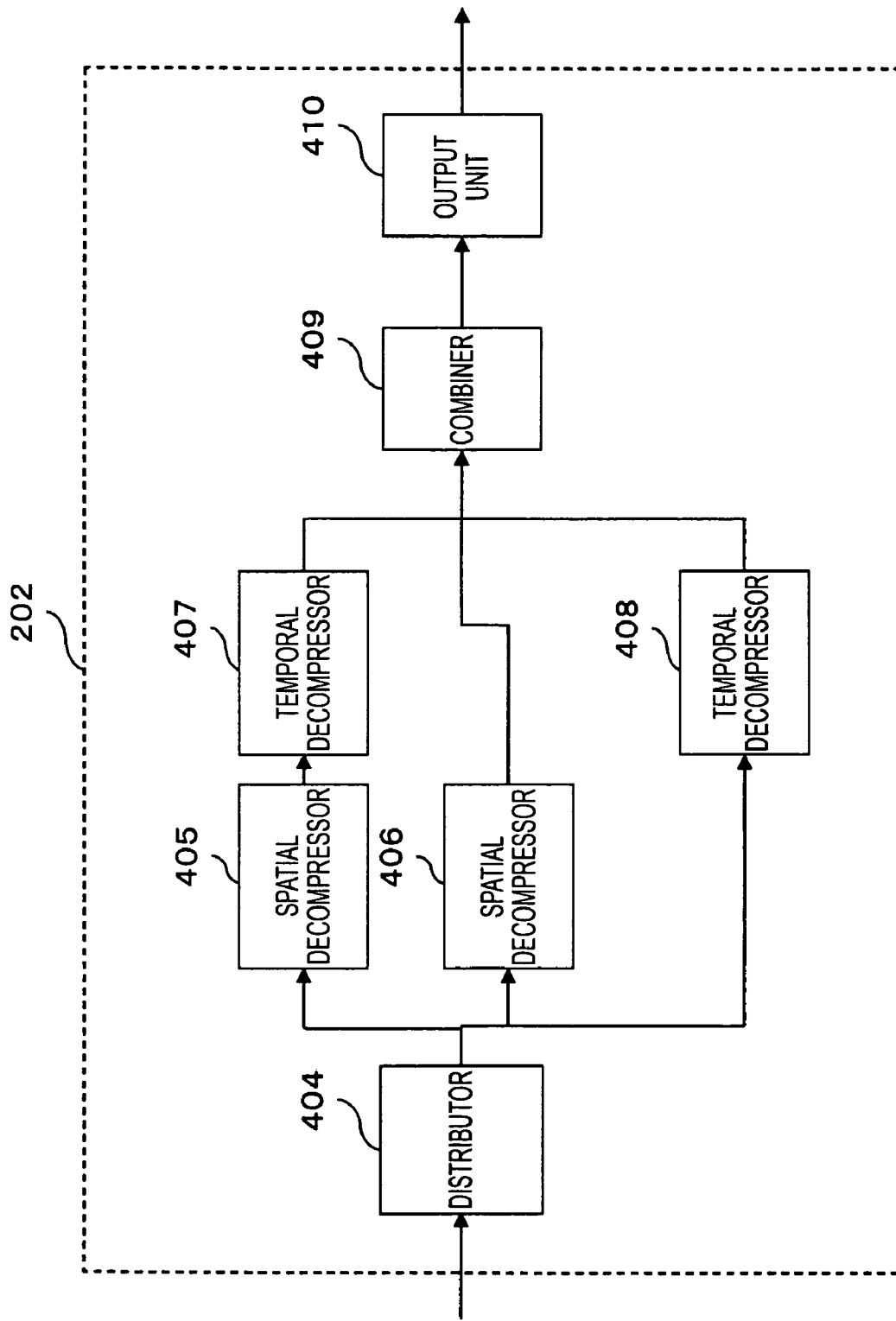
FIG. 17 is a block diagram showing the details of a motion image data converter of the playback apparatus shown in FIG. 15.

Now, referring to FIG. 17, the details of the motion image data converter 202 of the playback apparatus 200 (FIG. 15) are described.

If the motion image data converter 202 of the playback apparatus receives data played back, by the reproduction unit 201, from a recording medium or data input from the outside via a network or the like, the motion image data converter 202 decodes an image by decompressing the received image data. That is, the motion image data converter 202 serves as an image decoding processing unit for decoding the compressed data into an original form. Note that the inputting of compressed motion image data to the motion image data converter 202 is performed on a frame-by-frame basis.

The block distributor 404 shown in FIG. 17 extracts the decimation information attached to each block from the input motion image signal and supplies the data of each block to a correct unit in accordance with the decimation information. More specifically, if the decimation information attached to the block of interest indicates that the decimation was performed in the ½ spatial decimation mode, the block distributor 404 supplies the data of the block to the spatial decompression unit 405. However, if the decimation information indicates that the decimation was performed in the ¼ spatial decimation mode, the block distributor 404 supplies the data of the block to the spatial decompression unit 406. On the other hand, if the decimation information indicates that demosaicing should be performed, the block distributor 404 supplies the data of the block to the temporal decompression unit 408.

The temporal decompression processing unit 408 performs a temporal decompression process. More specifically, the temporal decompression processing unit 408 performs the temporal decompression by assigning the representative value selected from the successive four frames as described earlier with reference to FIG. 6 to all successive four frames, and the temporal decompression processing unit 408 supplies the resultant pixel values of each block together with the addresses of the respective pixels to the mixer 409.

The spatial decompression unit 406 decompresses the data of each block by a factor of 4 to reproduce a block including 4×4 pixels for each of the R, G, and B signals. More specifically, in accordance with the decimation information supplied from the block distributor 404, the spatial decompression unit 406 copies the representative value of each block into all successive four pixels located in the decimation direction, and the spatial decompression unit 406 supplies the resultant pixel values together with the addresses of the respective pixels to the mixer 408.

On the other hand, the spatial decompression unit 405 decompresses the data of each block by a factor of 2 to reproduce a block including 4×4 pixels for each of the R, G, and B signals. More specifically, in accordance with the decimation information supplied from the block distributor 404, the spatial decompression unit 405 copies the representative value of each block into successive two pixels located in the decimation direction. Subsequently, the temporal decompression unit 407 performs a temporal decompression process on the spatially decompressed data. More specifically, the temporal decompression is performed by assigning the values of one of successive two frames to the other frame. The resultant pixel values of each block obtained as a result of the decompression process are supplied, together with the addresses of the respective pixels, to the mixer 409.

The operation of the spatial decompression units 405 and 406 will be described in further detail later.

The mixer 409 includes an image buffer capable of storing one frame of image data. The decompressed data obtained as a result of the process performed by the spatial decompression unit 405 and the temporal decompression unit 407, the decompressed data obtained as a result of the process performed by the spatial decompression unit 406, and the decompressed data obtained as a result of the process performed by the temporal decompression unit 408 are supplied to the mixer 409. The mixer 409 writes the received block image data in the image buffer at addresses corresponding to respective pixels. In the process of writing the data in the image buffer, if a pixel value obtained as a result of the process performed for a block including that pixel has already been written in the image buffer at an address corresponding to that pixel, then any other pixel value obtained as a result of the process performed for an adjacent block is not written at the same address.

After the mixer 409 completes the process for all blocks of one frame, the mixer 409 determines whether there is a pixel whose value is not stored in the image buffer. If there is such a pixel, the mixer 409 detects the position of the pixel, and produces the pixel value of the pixel of interest by interpolation from pixel values of pixels located at both sides of the pixel of interest in a line along the decimation direction. Note that the method of recovers the missing pixel value is not limited to the interpolation, but other methods may be used.

The output unit 410 converts the one frame of image data produced via the combination process performed by the mixer 409 into a widely-used motion image signal format and outputs the resultant motion image signal. The output motion image signal may be in analog or digital form. When the motion image signal is output in analog form, the motion image signal is converted into an analog signal by a digital-to-analog converter (not shown).

The process performed by the spatial decimator 305 (shown in FIG. 16) in the motion image data converter 104 of the image sensing apparatus 100 shown n FIG. 14, and the process performed by the spatial decimator 306 (shown in FIG. 16) are described below with reference to FIG. 18.

Figure 18:
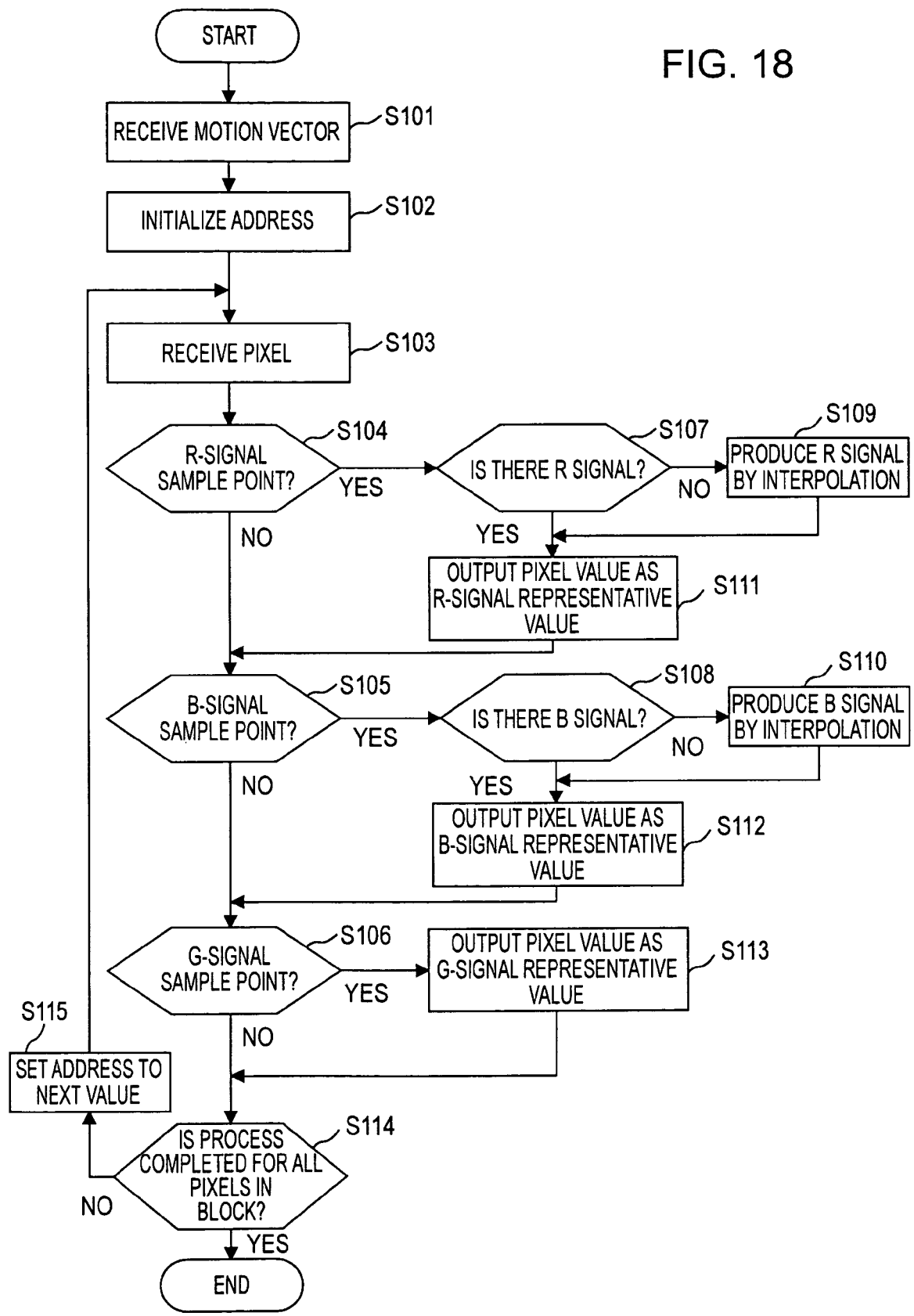
FIG. 18 is a flow chart showing in detail a process performed by a spatial decimator in a motion image data converter of an image pickup apparatus.

FIG. 18 is a flow chart showing a processing sequence performed by the spatial decimator 305 or 306. The operation of the spatial decimator 305 is similar to that of the spatial decimator 306 except for the difference in the amount of decimation, which is achieved simply by changing the position information associated with decimation sample points. Thus, the operation is described using the same flow chart for both spatial decimators.

In step S101, the spatial decimator 305 or 306 receives a motion vector of a block from the block distributor 303. The motion vector indicates the movement of a subject included in the block detected by the motion detector 304 (FIG. 16). If the motion vector is given, the spatial decimator 305 or 306 determines the decimation direction for the block based on the motion vector. As described earlier, the block distributor 303 supplies the block data to be processed and the information indicating the decimation direction to the spatial decimators 305 and 306. The information indicating the decimation direction supplied from the block distributor 303 to the spatial decimators 305 and 306 is given by the motion vector. The spatial decimator 305 or 306 makes a comparison between the horizontal and vertical components of the motion vector and sets the spatial decimation direction to be in the same direction as that of a greater component.

Figure 1:
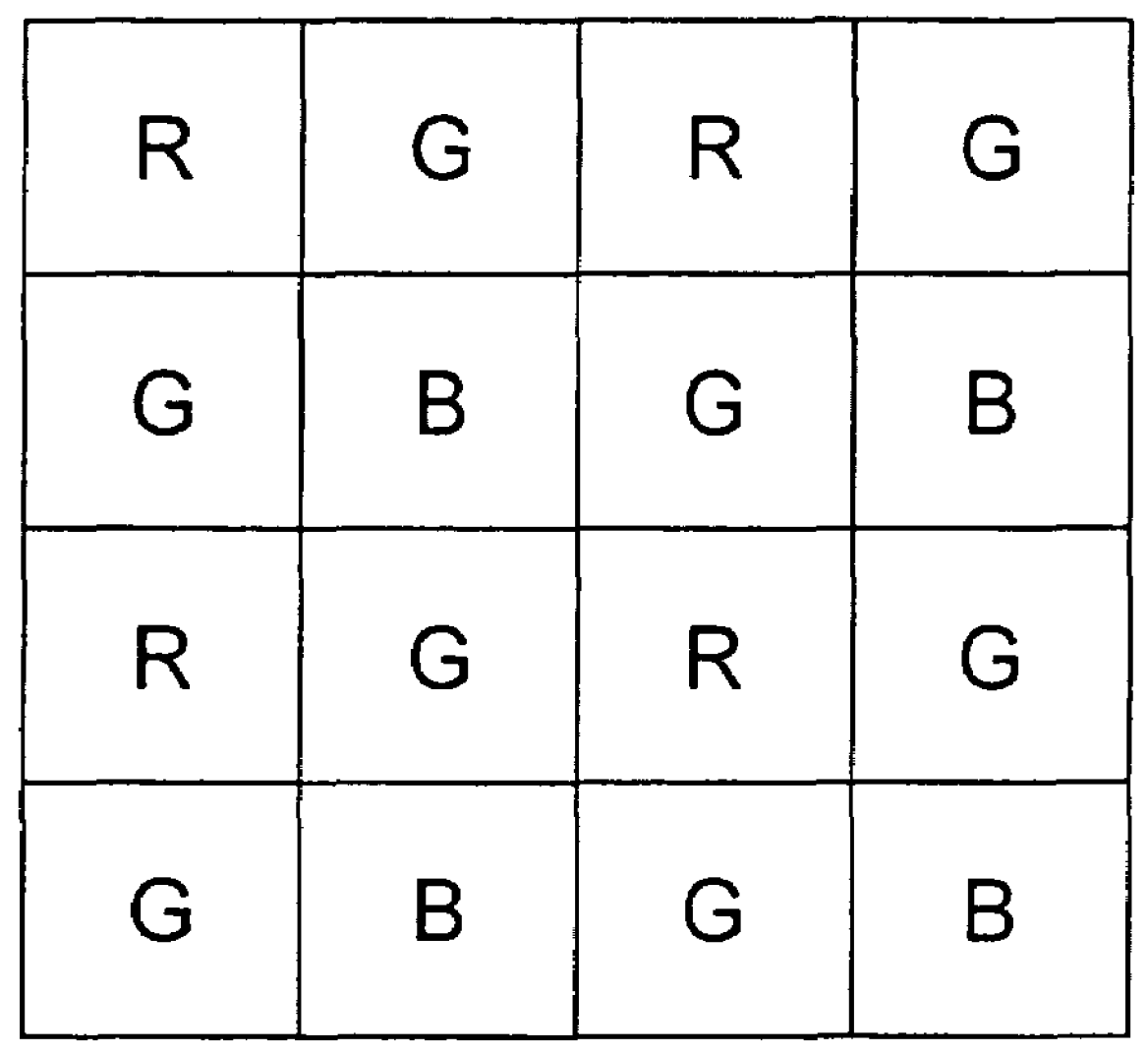
Figure 5:
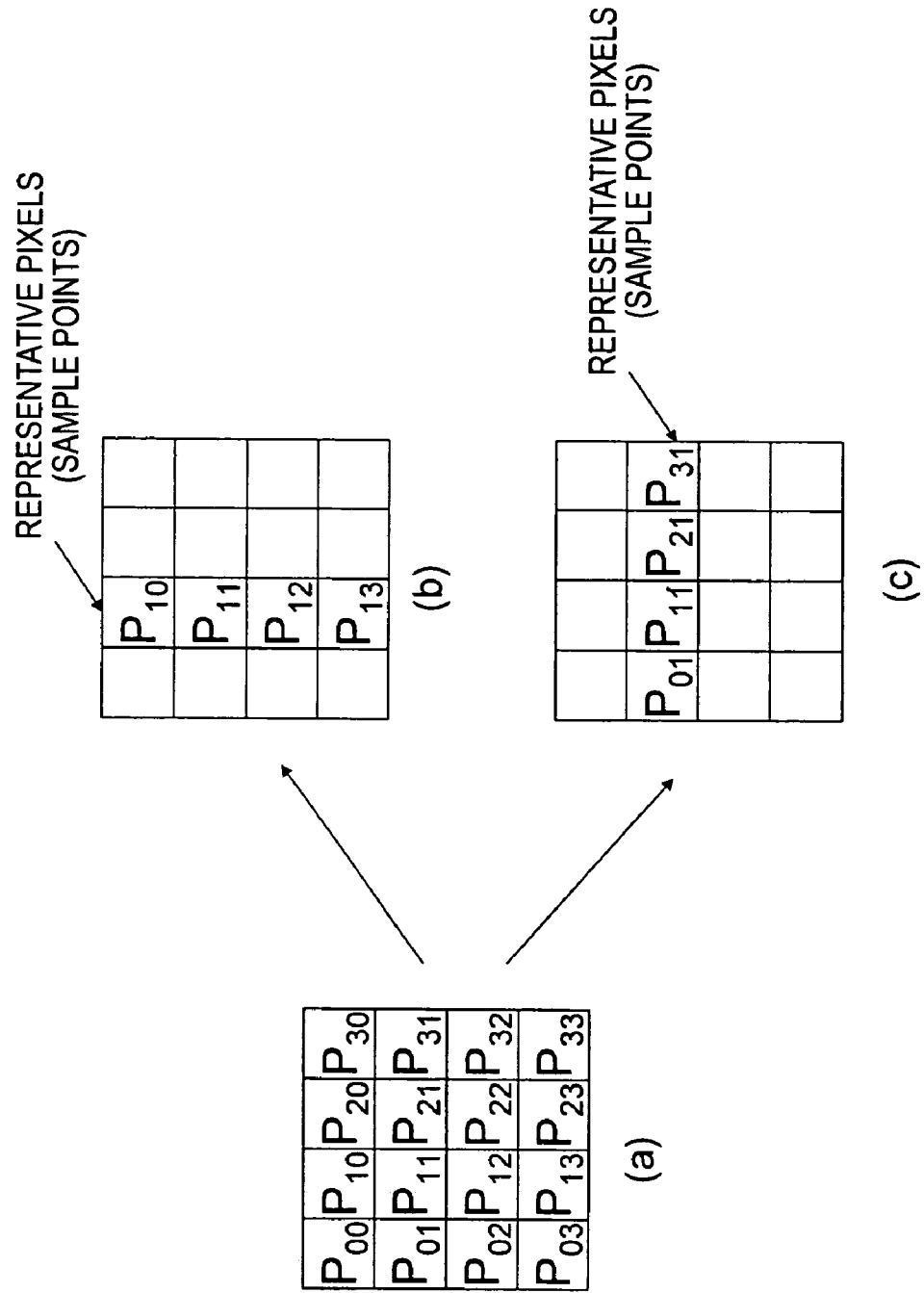
FIGS. 5A to 5C are diagrams showing a process performed by a block processing unit of a motion image data conversion apparatus.
Figure 7:
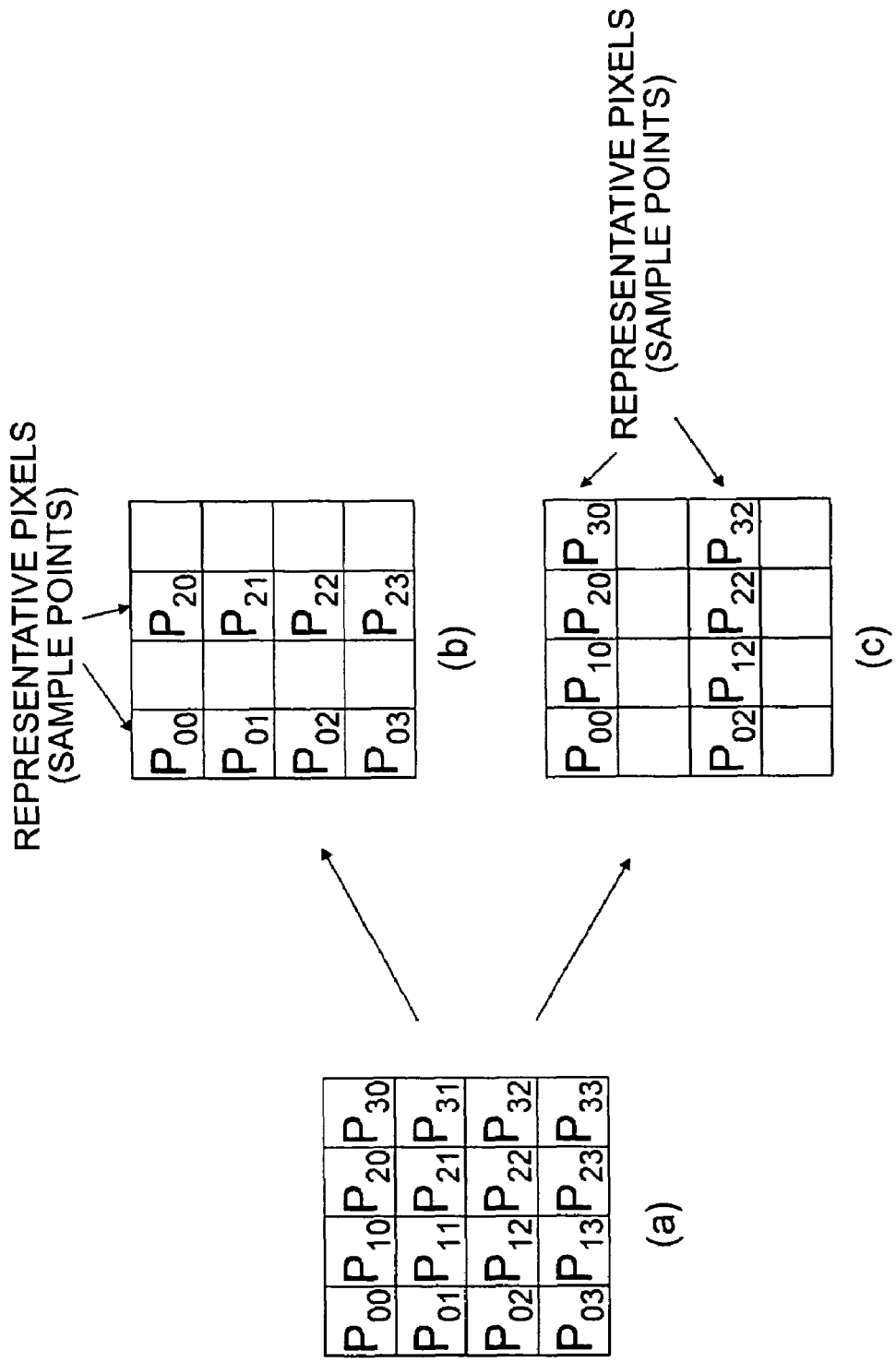
FIGS. 7A to 7C are diagrams showing a process performed by a block processing unit of a motion image data conversion apparatus.
Figure 8:
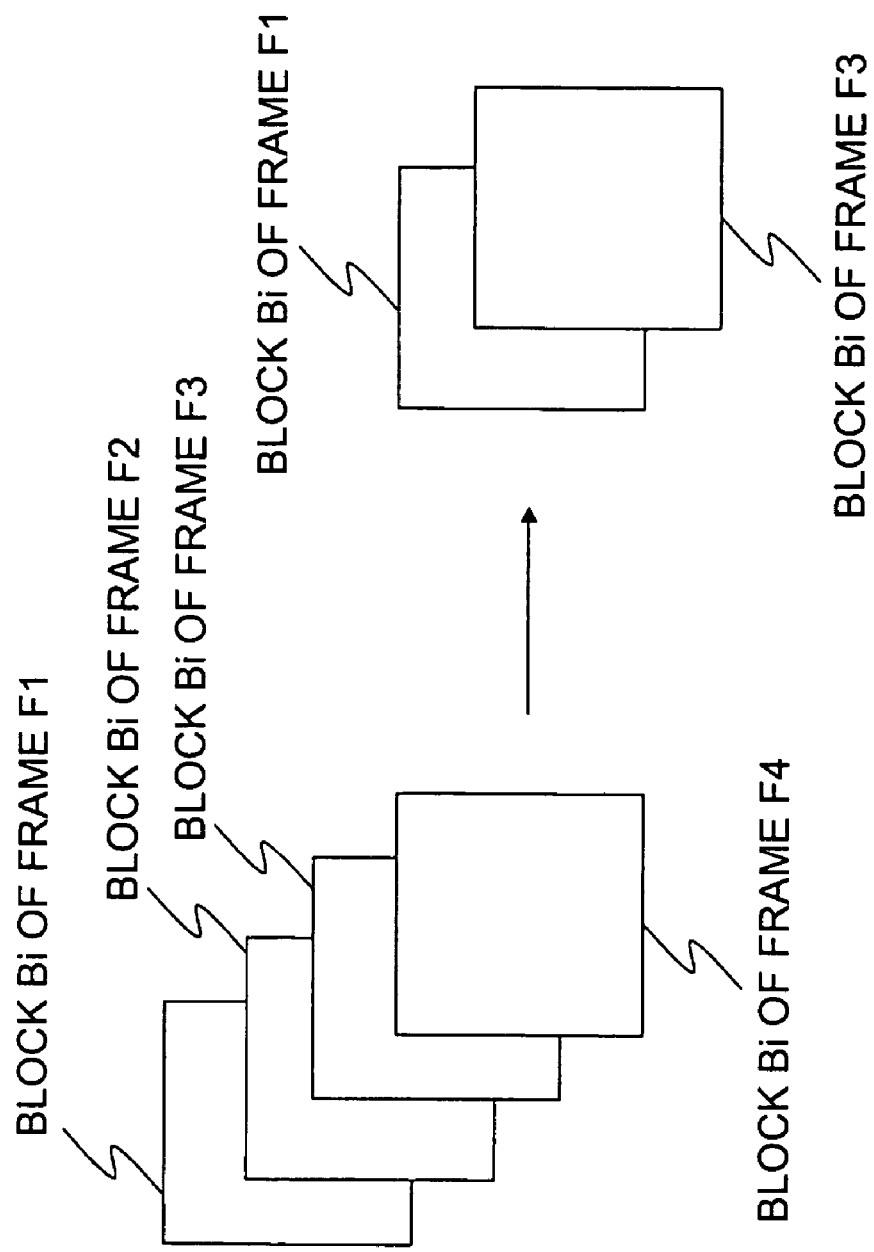
FIG. 8 is a diagram showing a process performed by a block processing unit of a motion image data conversion apparatus.

The spatial decimator 305 or 306 performs the spatial decimation process in the determined direction for each of the R, G, and B signals. The spatial decimator 305 performs the spatial decimation by a factor of 4 for each of the R, G, and B signals as shown in FIG. 5, and the spatial decimator 306 performs the spatial decimation by a factor of 2 for each of the R, G, and B signals as shown in FIG. 7. However, as described earlier, the single-plate solid-state color image sensor senses only a signal component with a particular wavelength for each pixel, that is, each pixel acquires color-component data with the particular wavelength passing through the Bayer primary color filter (FIG. 1). In the case in which the single-plate solid-state color image sensor with the Bayer-array filter is used, the image output from the solid-state image sensor is in the form of a color mosaic image in which each pixel has only information of one of R, G, and B colors, as with the output image 70 shown in FIG. 13. In the present embodiment, as shown in FIG. 16, the motion image data converter 104 the spatial decimator 305 or 306 performs the spatial decimation on the color mosaic image that has not been demosaiced. In this case, in the spatial decimation process, it is impossible to simply employ pixel values of pixels at particular positions (sample points) as representative values as with the process described above with reference to FIG. 5 or 7. For example, in the ¼ spatial decimation in the horizontal direction shown in FIG. 5B, the pixel values of pixels at second positions as counted from the left end are employed as representative values (sample points). However, each of these pixels located at the second positions has only one of R, G, and B pixel values and does not have pixel values of the other color components. Therefore, to obtain all R, G, and B pixel values in the spatial decimation process, it is required to change positions of representative pixels (sample points) or it is required to produce pixel values by interpolation.

Referring to FIGS. 19A to 19G and FIGS. 20A to 20G, examples of manners of setting representative pixel positions (sample points) are explained for respective R, G, and B signals of image data output from the Bayer-array single-plate solid-state image sensor. FIGS. 19A to 19G show an example of a manner in which sample points are set for respective R, G, and B signals in the spatial decimation in the horizontal direction, and FIGS. 20A to 20G show an example of a manner in which sample points are set for respective R, G, and B signals in the spatial decimation in the vertical direction.

Figures 19A, 19B, 19C, 19D, 19E, 19F, 19G:
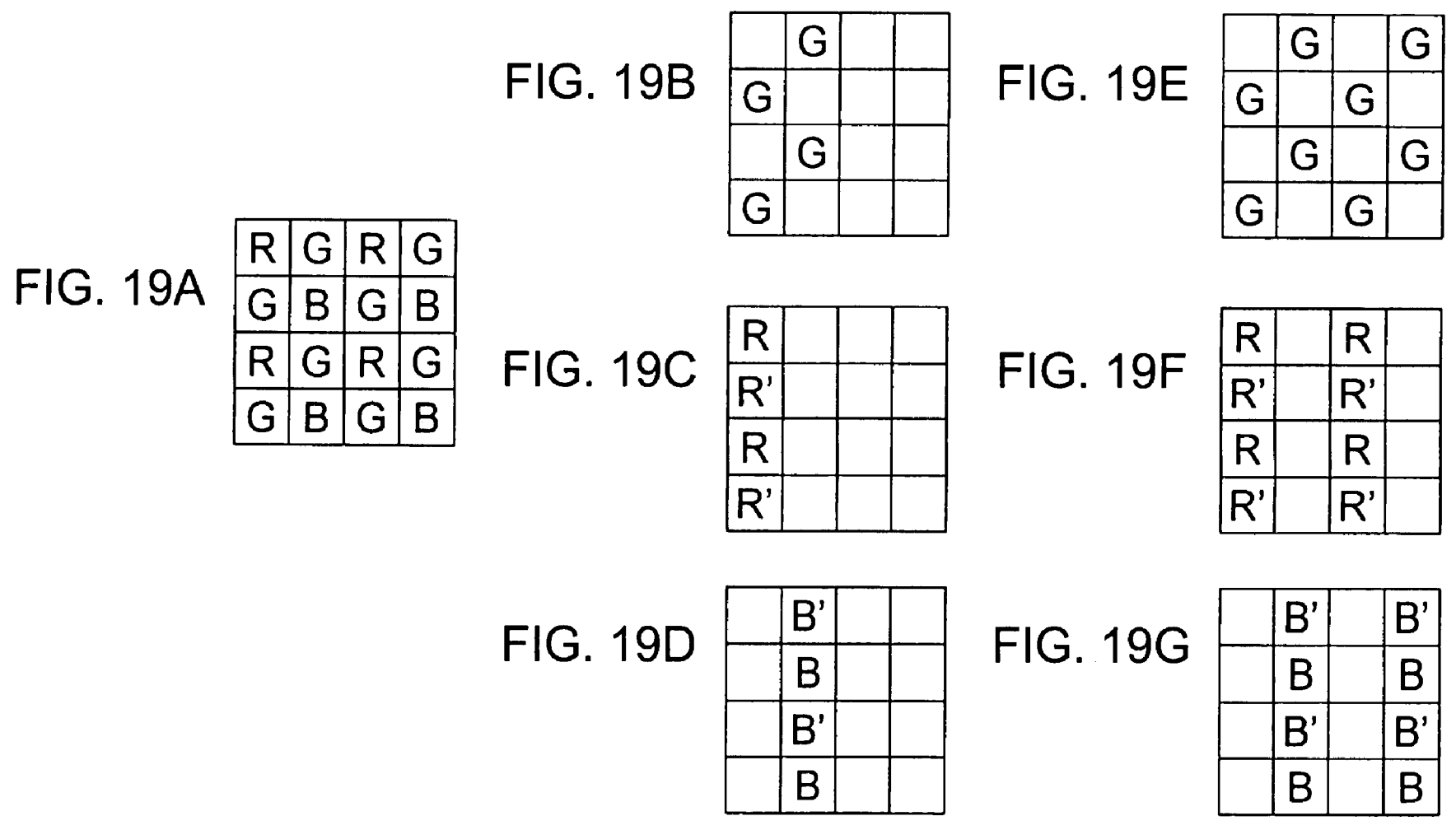

In Bayer-array image data, pixels have different color components depending on the positions of pixels, for example, as shown in FIG. 19A. When ¼ spatial decimation is performed in the horizontal direction on such image data, one pixel is selected from every four pixels in the horizontal direction and the pixel value of each selected pixel is employed as the representative value (sample point). In the case in which ½ spatial decimation is performed in the horizontal direction, one pixel is selected from every two pixels in the horizontal direction and the pixel value of each selected pixel is employed as the representative value (sample point).

In the ¼ spatial decimation in the horizontal direction, the representative pixel positions (sample points) are set in each 4×4 pixel block, for example, as shown in FIG. 19B to 19D. For G signals, as shown in FIG. 19B, a G signal of a pixel at the leftmost position or next to the leftmost position in each horizontal pixel line from the top to the bottom horizontal lines is employed as the representative pixel value (sample point).

For R signals in the top and third horizontal pixel lines, as shown in FIG. 19C, a R signal of a pixel at the leftmost position is employed as the representative pixel value (sample point) for each of these horizontal pixel lines. In the second and fourth horizontal lines, there are no R signals, and thus the R signal value (R') employed as the representative value (sample point) for each of these lines is calculated from R signals of upper and lower adjacent pixels by linear interpolation. For B signals in the second and fourth horizontal pixel line, as shown in FIG. 19D, a B signal of a pixel at the leftmost position is employed as the representative pixel value (sample point) for each of these horizontal pixel lines. In the first and third horizontal pixel lines, there are no B signals, and thus the B signal value (B') to be employed as the representative value (sample point) for each of these lines is calculated from B signals of upper and lower adjacent pixels by linear interpolation.

In the ½ spatial decimation in the horizontal direction, the representative pixel positions (sample points) are set in each 4×4 pixel block, for example, as shown in FIGS. 19B to 19C, For G signals in each horizontal pixel line from the top to the bottom horizontal lines, as shown in FIG. 19E, a G signal existing at every other pixel is employed as the representative pixel value (sample point).

For R signals in the top and third horizontal pixel lines, as shown in FIG. 19F, a R signal existing at every other pixel is employed as the representative pixel value (sample point). In the second and fourth horizontal pixel lines, there are no R signals, and thus the R signal value (R') employed as the representative value (sample point) for each of these lines is calculated from R signals of upper and lower adjacent pixels by linear interpolation. For B signals in the second and fourth horizontal pixel line, as shown in FIG. 19G, a B signal existing at every other pixel is employed as the representative pixel value (sample point). In the first and third horizontal pixel lines, there are no B signals, and thus the B signal value (B') to be employed as the representative value (sample point) for each of these lines is calculated from B signals of upper and lower adjacent pixels by linear interpolation.

FIGS. 20A to 20G show examples of manners in which sample points are set for each of R, G, and B signals in the spatial decimation in the vertical direction. In the ¼ spatial decimation in the vertical direction, one pixel is selected from every four pixels in the vertical direction and the pixel value of each selected pixel is employed as the representative value (sample point). In the case in which ½ spatial decimation is performed in the vertical direction, one pixel is selected from every two pixels in the vertical direction and the pixel value of each selected pixel is employed as the representative value (sample point).

Figures 20A, 20B, 20C, 20D, 20E, 20F, 20G:
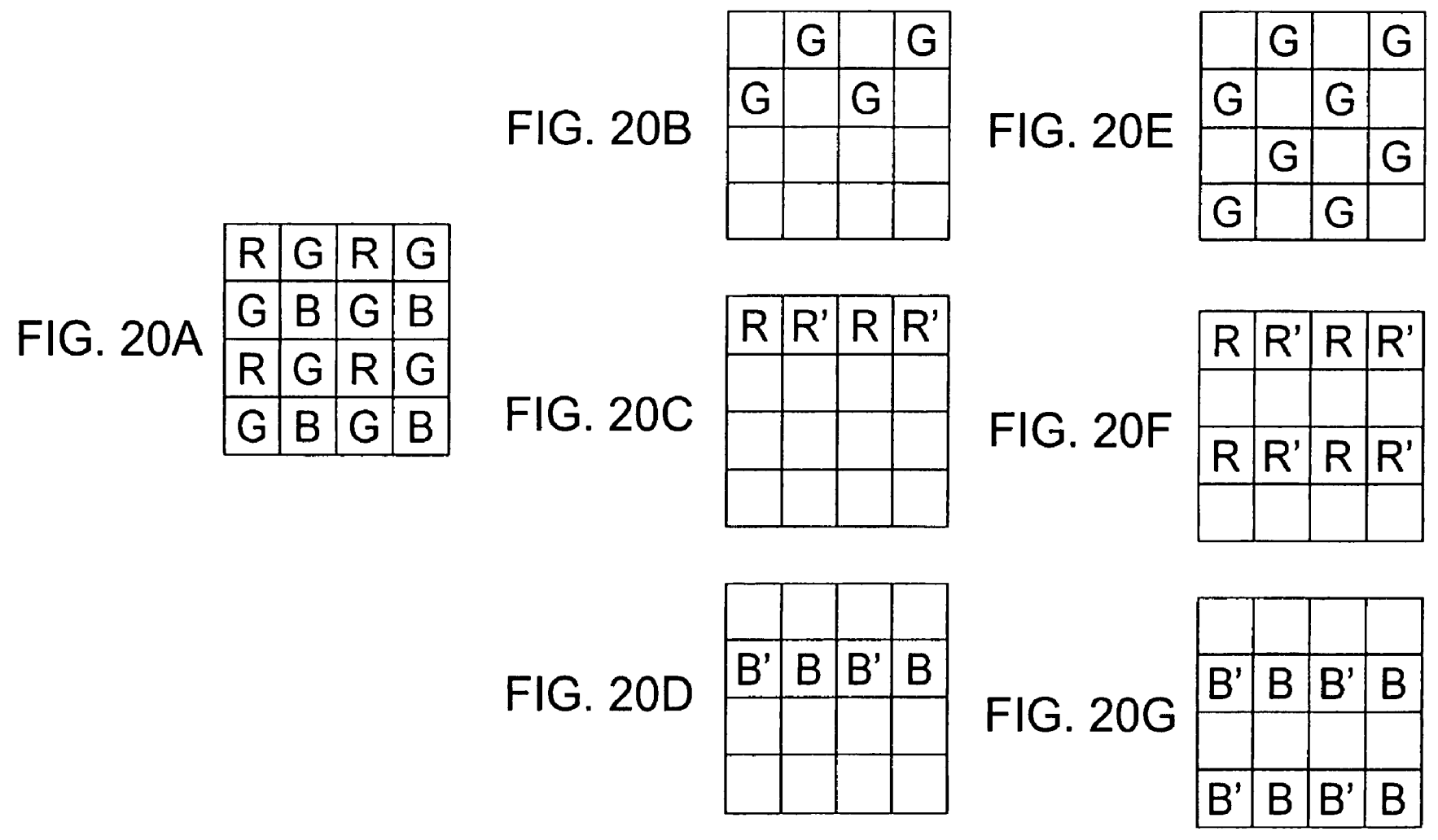

In the ¼ spatial decimation in the vertical direction, the representative pixel positions (sample points) are set in each 4×4 pixel block, for example, as shown in FIGS. 20B to 20D. For G signals in each vertical pixel line from the leftmost to the rightmost vertical pixel lines, as shown in FIG. 20B, a G signal of a pixel at the top position or next to the top position in each of these vertical pixel line is employed as the representative pixel value (sample point).

For R signals in the leftmost and third vertical pixel lines, as shown in FIG. 20C, a R signal existing at the top pixel is employed as the representative pixel value (sample point). In the second and fourth vertical pixel lines, there are no R signals, and thus the R signal value (R') employed as the representative value (sample point) for each of these vertical lines is calculated from R signals of right-hand and left-hand adjacent pixels by linear interpolation. For B signals in the second and fourth vertical pixel line, as shown in FIG. 20D, a B signal of a pixel at the second position as counted from the top is employed as the representative pixel value (sample point) for each of these horizontal pixel lines. In the first and third vertical pixel lines, there are no B signals, and thus the B signal value (B') to be employed as the representative value (sample point) for each of these lines is calculated from B signals of right-hand and left-hand adjacent pixels by linear interpolation.

In the ½ spatial decimation in the vertical direction, the representative pixel positions (sample points) are set in each 4×4 pixel block, for example, as shown in FIGS. 20E to 20G. For G signals, as shown in FIG. 20E, a G signal existing at every other pixel is employed as the representative pixel value (sample point).

For R signals in the leftmost and third vertical pixel lines, as shown in FIG. 20F, a R signal existing at every other pixel is employed as the representative pixel value (sample point). In the second and fourth vertical pixel lines, there are no R signals, and thus the R signal value (R') employed as the representative value (sample point) for each of these vertical lines is calculated from R signals of right-hand and left-hand adjacent pixels by linear interpolation. For B signals in the second and fourth vertical pixel line, as shown in FIG. 20G, a B signal existing at every other pixel is employed as the representative pixel value (sample point). In the first and third vertical pixel lines, there are no B signals, and thus the B signal value (B') to be employed as the representative value (sample point) for each of these lines is calculated from B signals of right-hand and left-hand adjacent pixels by linear interpolation.

The process of setting representative values (sample points) is performed in step S102 and following steps shown in the flow chart of FIG. 18. In S102, the spatial decimator 305 or 306 initializes address values of pixels in a block of interest. In step S103, the spatial decimator 305 or 306 receives first pixel data from the block distributor 303.

In step S104, it is determined whether the given pixel data is of a pixel located at a decimation sample point for the R signal. If it is determined that the given pixel data is of a pixel located at a decimation sample point for the R signal, the process proceeds to step S107. However, if the given pixel data is not of a pixel located at a decimation sample point for the R signal, that is, if the given pixel data should be discarded, the process proceeds to step S105.

In step S104 described above, the determination as to whether the given pixel data is of a pixel located at a decimation sample point for the R signal is made, for example, by determining whether the pixel of interest is located at one of pixel positions denoted by R or R' shown in FIG. 19C in the case of the ¼ horizontal decimation mode. More specifically, only when pixel data of a pixel at the leftmost position is input, the pixel is determined to be at a sample point, and the process proceeds to step S107. In any other case, the pixel is not at a sample point for the R signal, and thus the process proceeds to step S105. In the ½ vertical decimation mode, as shown in FIG. 19F, only when pixel data of a pixel in the top horizontal line or in the third horizontal line is input, it is determined that the pixel is at a sample point, and the process proceeds to step S107. In any other case, the pixel is not at a sample point for the R signal, and the process proceeds to step S105. As described above, the determination as to whether the given pixel is at a sample point is made differently depending on the spatial decimation mode.

When a pixel at a sample point for the R signal is given as a pixel to be processed, the process proceeds to step S107, and it is determined whether the given pixel is located at one of R-signal positions in the color mosaic array (such as that shown in FIG. 19A).

Figure 21:
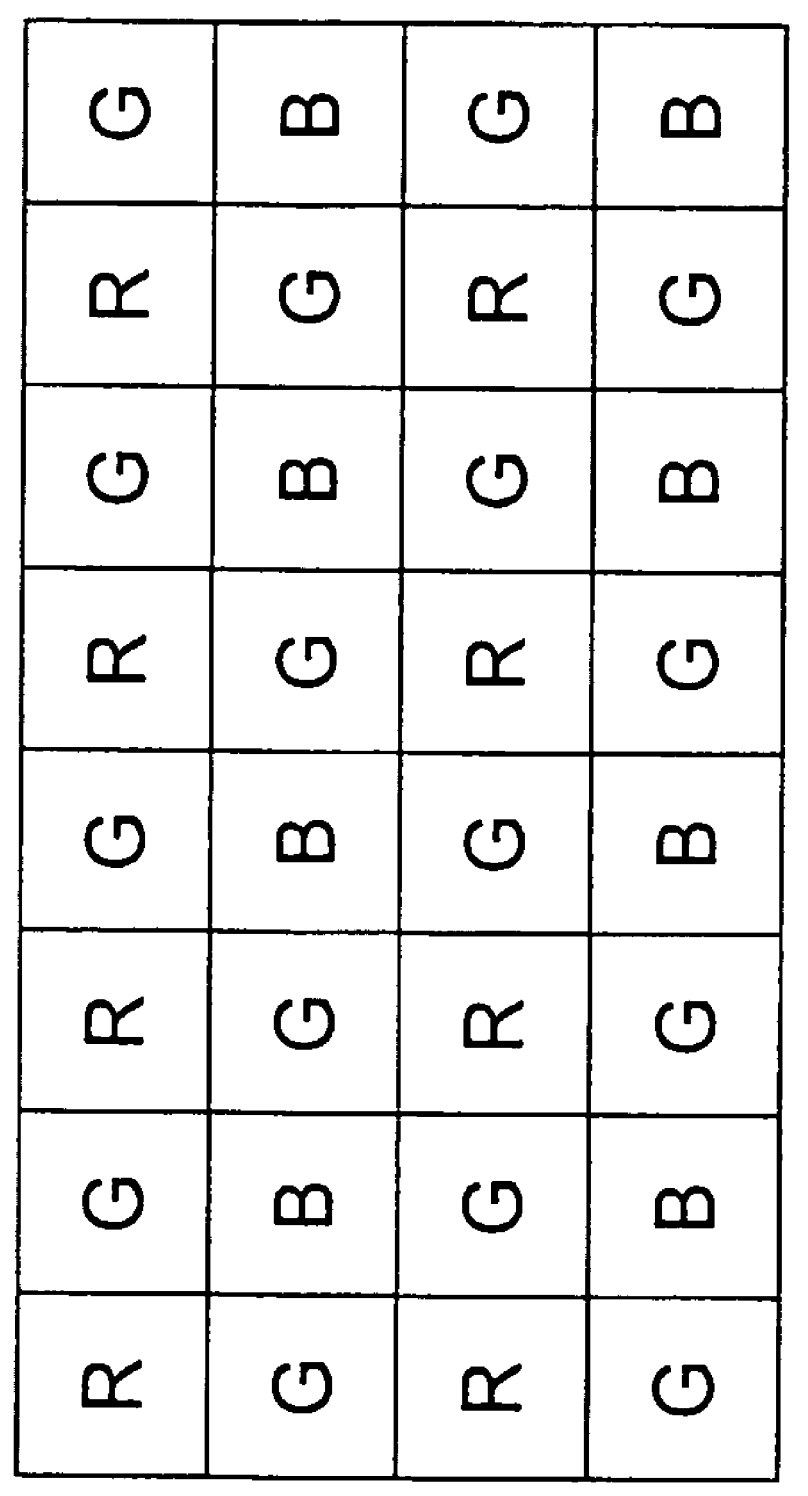

FIG. 21 shows an example of a Bayer array, for two blocks including a total of 4×8 elements. In the Bayer array, as shown in FIG. 21, R-signal pixels are located at every other position in every other horizontal line. When decimation in the horizontal direction is performed, as described above, each horizontal pixel line should have sample points, and R-signal values (representative values) at sample points should be defined even in horizontal pixel lines in which there are no R-signal pixels.

In the horizontal decimation process, as described above with reference to FIGS. 19 and 20, R-signal sample points (representative values) are defined in each horizontal pixel line. In the case of the vertical decimation process, R-signal sample points (representative values) are defined in each vertical pixel line. In the ¼ spatial decimation mode, one sample point (one representative value) is defined in each pixel line. On the other hand, in the ½ spatial decimation mode, two sample points (two representative values) are defined in each pixel line. For pixels lines having R-signal pixels, sample points are defined at proper one or two of these R-signal pixels in each line. In this case, step S107 is affirmatively answered, and thus the process proceeds to step S111 in which the pixel value at a sample point is output as a representative value for the R signal.

However, when there are no R-signal pixels in a pixel line of interest, the R-signal pixel value at a sample point in the pixel line of interest is calculated from pixel values of vertically or horizontally adjacent R-signal pixels by using linear interpolation. In examples shown in FIGS. 19C and 19F and FIGS. 20C and 20F, pixel values at positions denoted by R' are calculated in this way. In this case, step S107 is negatively answered, and thus the process proceeds to step S109 to calculate the R-signal pixel value (R') by the interpolation, and, in step S111, the resultant R-signal pixel value is output as the representative value.

As can be seen from FIGS. 19 and 20, for pixel lines in which there are no R-signal pixels, sample points are set at positions where R-signal values at sample points can be calculated from R-signal pixels at vertically adjacent positions in the horizontal spatial decimation mode or from R-signal pixels of horizontally vertically adjacent positions in the vertical spatial decimation mode. By setting the decimation sample points in the above-described manner, it becomes possible to perform the interpolation using pixel values of horizontally or vertically adjacent two pixels.

In step S111, the spatial decimator 305 or 306 outputs the R-signal pixel value at the current pixel position as the representative value for the R signal to the mixer 309. If the R-signal processing at the present pixel position is completed, the process proceeds to step S105.

In step S105, 4a decimation sample point for the B signal. The determination as to whether the given pixel data is of a pixel located at a decimation sample point for the B signal is made, for example, by determining whether the pixel of interest is located at one of pixel positions denoted by B or B' shown in FIG. 19D in the case of the ¼ horizontal decimation mode. More specifically, only when pixel data of a pixel at a second position as counted from the leftmost potion is input, it is determined that the pixel is at a sample point, and the process proceeds to step S108. In any other case, it is determined that the pixel is not at a sample point for the B signal, and the process proceeds to step S106. In the ½ vertical decimation mode, as shown in FIG. 20G, only when pixel data of a pixel at a second or fourth position as counted from the top position in a vertical line, it is determined that the pixel is at a sample point, and the process proceeds to step S108. In any other case, it is determined that the pixel is not at a sample point for the B signal, and the process proceeds to step S106. As described above, the determination as to whether the given pixel is at a sample point is made differently depending on the spatial decimation mode.

In step S108, it is determined whether the given pixel is located at one of B-signal positions in the color mosaic array. In the Bayer array shown in FIG. 21, B-signal pixels are located at every other position in every other horizontal line, and the other horizontal pixel lines include no B-signal pixels. When decimation in the horizontal direction is performed, as described above, each horizontal pixel line should have sample points, and B-signal values (representative values) at sample points should be defined even in horizontal pixel lines in which there are no B-signal pixels.

In the horizontal decimation process, as described above with reference to FIGS. 19 and 20, B-signal sample points (representative values) are defined in each horizontal pixel line. In the case of the vertical decimation process, B-signal sample points (representative values) are defined in each vertical pixel line. In the ¼ spatial decimation mode, one sample point (one representative value) is defined in each pixel line. On the other hand, in the ½ spatial decimation mode, two sample points (two representative values) are defined in each pixel line. For pixels lines having B-signal pixels, sample points are defined at proper one or two of these B-signal pixels in each line. In this case, step S108 is affirmatively answered, and thus the process proceeds to step S112 in which the pixel value at a sample point is output as a representative value for the B signal.

However, when there are no B-signal pixels in a pixel line of interest, the B-signal pixel value at a sample point in the pixel line of interest is calculated from pixel values of vertically or horizontally adjacent B-signal pixels by using linear interpolation. In examples shown in FIGS. 19D and 19G and FIGS. 20D and 20G, pixel values at positions denoted by B' are calculated in this way. In this case, step S108 is negatively answered, and thus the process proceeds to step S110 to calculate the B-signal pixel value (B') by the interpolation, and, in step S112, the resultant B-signal pixel value is output as the representative value.

In step S112, the spatial decimator 305 or 306 outputs the B-signal pixel value at the current pixel position as the representative value for the B signal to the mixer 309. If the B-signal processing at the present pixel position is completed, the process proceeds to step S106.

In step S106, it is determined whether the given pixel data is of a pixel located at a decimation sample point for the G signal. In the horizontal decimation mode, G-signal decimation sample points are set as shown in FIG. 19B or 19E. On the other hand, in the vertical decimation mode, G-signal decimation sample points are set as shown in FIG. 20B or 20E. If it is determined that the given pixel data is of a pixel located at a decimation sample point for the G signal, the process proceeds to step S113. However, if the given pixel data is not of a pixel located at a decimation sample point for the G signal, that is, if the given pixel data should be discarded, the process proceeds to step S114.

In the Bayer array shown in FIG. 21, G-signal pixels are arranged in a checkerboard-like pattern, and any pixel line (column) includes G-signal pixels. Therefore, it is not necessary to determine whether there are G-signal pixels. Thus, if the given pixel data is of a pixel located at a decimation sample point for the G signal, then in step S113, the B-signal pixel value at this pixel position is output as the representative value for the B signal to the mixer 309. More specifically, in the ¼ horizontal spatial decimation mode, pixel values at pixel positions shown in FIG. 19B are output, while pixel values at pixel positions shown in FIG. 19E are output in the ½ horizontal spatial decimation mode. On the other hand, in the ¼ vertical spatial decimation mode, pixel values at pixel positions shown in FIG. 20B are output, while pixel values at pixel positions shown in FIG. 20E are output in the ½ vertical spatial decimation mode.

If all processes are completed for the pixel at the present position, the process proceeds to step S114. In step S114, it is determined whether the process is completed for all pixels in the block. If it is determined that the process is completed for all pixels, the process for the present block is ended. However, if it is determined that the process is not completed for all pixels in the block, the process proceeds to step S115. In step S115, the address value is incremented to a value of a next pixel position. Thereafter, the process returns to step S103. In step S103, the spatial decimator 305 or 306 receives next pixel data from the block distributor 303.

The process described above is performed repeatedly until the process has been performed for all pixels of the current block.

The decimation sample point positions for the respective R, G, and B signals, and data acquired as a result of the spatial decimation are described in further detail below. FIG. 21 shows an example of a color mosaic image signal in the Bayer-array form.

Referring to FIGS. 22A to 22D showing two horizontally adjacent blocks in a Bayer-array color mosaic image, a manner in which decimation sample points are set in the decimation process in the ¼ horizontal decimation mode performed by the spatial decimator 306 is described. In the Bayer array, as shown in FIG. 22A, G-signal pixels are arranged in a checkerboard-like pattern. On the other hand, R-signal pixels and B-signal pixels are arranged at every other pixel position in every other line.

FIGS. 22B, 22C, and 22D respectively show arrangements of pixel values of a block image reproduced from the respective G, R, and B representative values (sample points). In FIGS. 22B, 22C, and 22D, pixels denoted by a symbol $G_{01}$ or the like have pixel values equal to a representative pixel value of a sample point denoted by the same symbol $G_{01}$ or the like. The process of reproducing image data shown in FIGS. 22B, 22C and 22D will be described in detail later.

In the horizontal decimation mode, the spatial decimator 306 employs one pixel value as a representative pixel value for each horizontal line of each block, separately for each of R, G, and B signals. In the case of the G signal, each horizontal pixel line of a color mosaic image has G-signal pixels, and thus one or more of G-signal pixels in each horizontal pixel line are employed as representative pixel values. More specifically, for an uppermost horizontal pixel line, $G_{01}$ and $G_{05}$ are employed as representative values. For a next horizontal pixel line, $G_{10}$ and $G_{14}$ are employed as representative values. As can be seen from the figure, positions (phases) of G-signal representative pixels vary by one pixel between two directly adjacent pixel lines.

In the case of the R and B signals, for each pixel line having R or B-signal pixels, one or more of R or B-signal pixel values are employed as representative values. For example, in the ¼ horizontal spatial decimation mode, $R_{00}$ and $R_{04}$ are employed as R-signal representative values for a first pixel line, and $B_{11}$ and $B_{15}$ are employed as B-signal representative values for a second pixel line. On the other hand, for each pixel line having no R or B-signal pixels, sample points in such a pixel line are selected such that the sample points are directly adjacent to R or B-signal pixels in directly adjacent upper and lower pixel lines. For example, $R_{10}$ and $R_{14}$ are employed as R-signal representative pixels for a second pixel line, and $B_{21}$ and $B_{25}$ are employed as B-signal representative pixels for a third pixel line.

The value of $R_{10}$ is given by the following equation.

$$R_{10}=(½)(R_{00}+R_{20})$$

The value of $R_{14}$ is calculated from $R_{04}$ and $R_{24}$ according to a similar equation. $R_{10}$ and $R_{14}$ correspond to block data R' shown in FIG. 19C, and they are representative values calculated from R-signal pixel values of pixels at adjacent pixel positions.

The value of $B_{21}$ is given by the following equation.

$$B_{21}=(½)(B_{11}+B_{31})$$

The value of $B_{25}$ is calculated from $B_{15}$ and $R_{35}$ according to a similar equation. $B_{21}$ and $B_{25}$ correspond to block data B' shown in FIG. 19D, and they are representative values calculated from B-signal pixel values of pixels at adjacent pixel positions.

As can be seen from FIGS. 22A to 22D, R-signal representative pixels are at the same positions for all pixel lines. This also holds for B-signal representative pixels.

Referring to FIGS. 23A to 23D showing two horizontally adjacent blocks in a Bayer-array color mosaic image, a manner in which decimation sample points are set in the decimation process in the ½ horizontal decimation mode performed by the spatial decimator 305 is described. In the horizontal decimation mode, the spatial decimator 305 employs two pixel values as representative pixel values for each horizontal line of each block, separately for each of R, G, and B signals. In the Bayer array, as shown in FIG. 23A, G-signal pixels are arranged in a checkerboard-like pattern. On the other hand, R-signal pixels and B-signal pixels are arranged at every other pixel position in every other line.

FIGS. 23B, 23C, and 23D respectively show arrangements of pixel values of a block image reproduced from the respective G, R, and B representative values (sample points). In FIGS. 23B, 23C, and 23D, pixels denoted by a symbol $G_{01}$ or the like have pixel values equal to a representative pixel value of a sample point denoted by the same symbol $G_{01}$ or the like. The process of reproducing image data shown in FIGS. 23B, 23C and 23D will be described in detail later.

For the G signal, the spatial decimator 305 employs all G-signal pixel values in the color mosaic image as R-signal representative pixel values. For example, $G_{01}$, $G_{03}$, $G_{05}$, $G_{07}$ are employed as representative values in a first pixel line, and $G_{10}$, $G_{12}$, $G_{14}$, $G_{16}$ are employed as representative values in a second pixel line. Also in this case, positions (phases) of G-signal representative pixels vary by one pixel between two directly adjacent pixel lines.

In the case of the R and B signals, for each pixel line having R or B-signal pixels, all R or B-signal pixel values are employed as representative values. For example, $R_{00}$, $R_{02}$, $R_{04}$ and $R_{06}$ are employed as R-signal representative values for the first pixel line, and $B_{11}$, $B_{13}$, $B_{15}$ and $B_{17}$ are employed as B-signal representative values for the second pixel line. On the other hand, for each pixel line having no R or B-signal pixels, sample points in such a pixel line are selected such that the sample points are directly adjacent to R or B-signal pixels in directly adjacent upper and lower pixel lines. For example, $R_{10}$, $R_{12}$, $R_{14}$ and $R_{16}$ are employed as R-signal representative values for the second pixel line, and $B_{21}$, $B_{23}$, $B_{25}$ and $B_{27}$ are employed as B-signal representative values for a third pixel line. These representative values are calculated by interpolation using pixel values in adjacent upper and lower pixel lines, as described above. R-signal representative pixels are at the same positions for all pixel lines. This also holds for B-signal representative pixels.

Figure 24:
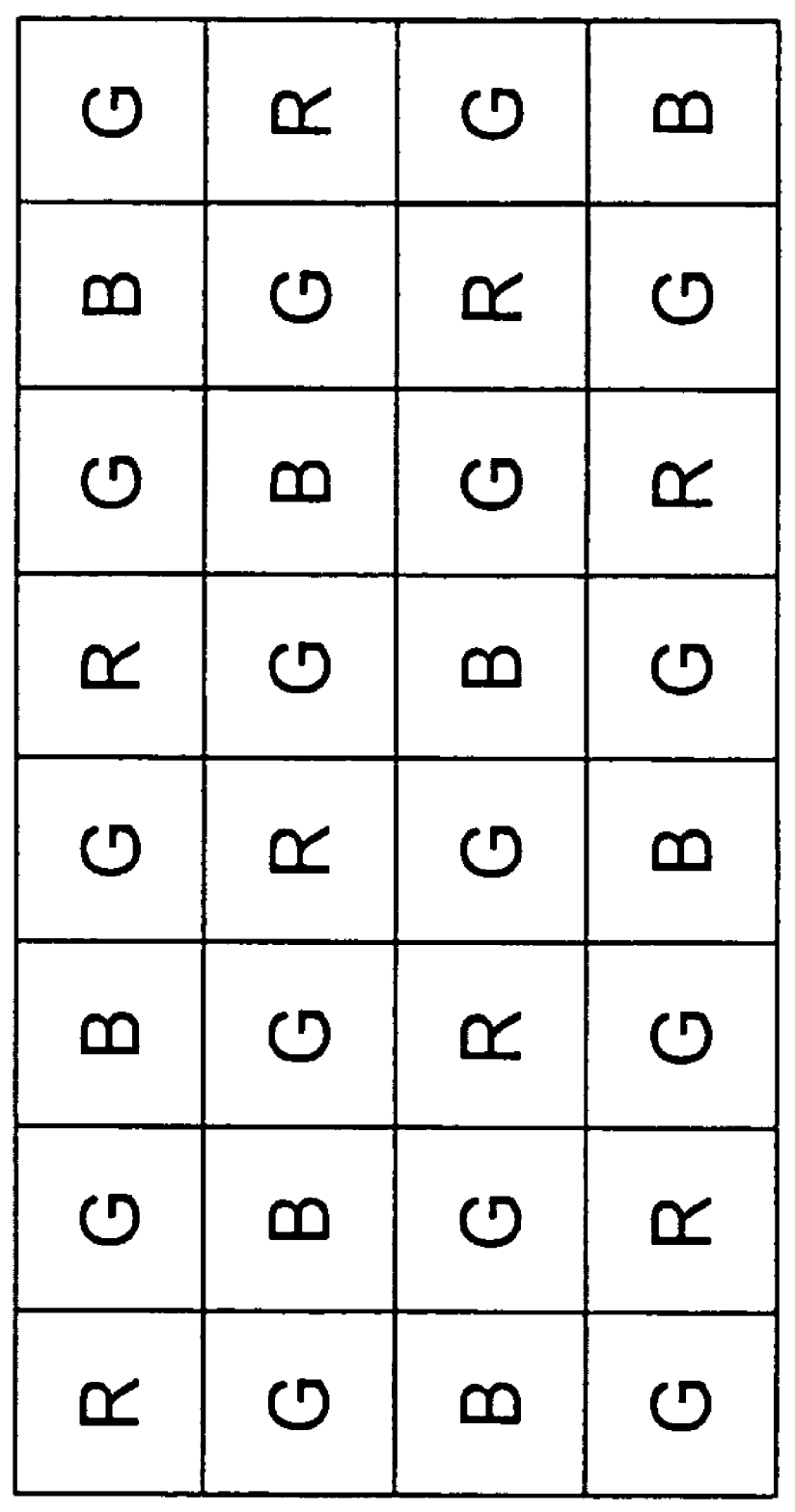

FIG. 24 shows another example of an arrangement of pixels of a color mosaic image signal. Note that the process according to any embodiment of the present invention disclosed herein may be applied not only to image data in the Bayer array shown in FIG. 21 but also to image data in other color pixel arrangements. In the example of the color pixel arrangement shown in FIG. 24, pixels are arranged in the order R, G, and B in any vertical pixel line and also in any horizontal line, and any pixel line has R, G, and B pixels.

Referring to FIGS. 25A to 25D showing two horizontally adjacent blocks of a color mosaic image having pixels arranged as shown in FIG. 24, a manner in which decimation sample points are set in the decimation process in the ¼ horizontal decimation mode performed by the spatial decimator 306 is described. In this color pixel arrangement, the R-signal pixels and the B-signal pixels in the Bayer-array arrangement are replaced with each other, and as shown in FIG. 25A, any pixel line has R, G, and B-signal pixels.

FIGS. 25B, 25C, and 25D respectively show arrangements of pixel values of a block image reproduced from the respective G, R, and B representative values (sample points). In FIGS. 25B, 25C, and 25D, pixels denoted by a symbol $G_{01}$ or the like have pixel values equal to a representative pixel value of a sample point denoted by the same symbol $G_{01}$ or the like. The process of reproducing image data shown in FIGS. 25B, 25C and 25D will be described in detail later.

In the color pixel arrangement shown in FIG. 25A, G-signal representative-pixel positions (sample points) are selected in a similar manner to the Bayer-array arrangement described above. That is, in the color pixel arrangement shown in FIG. 25A, G-signal pixels are arranged in a checkerboard-like pattern as in the Bayer-array arrangement, and decimation sample points are set at similar positions similar as described earlier with reference to FIG. 22.

As for the R and B signals, each pixel line (each pixel column) in each block has R and B-signal pixels, and these pixels are employed as representative pixels. For example, $R_{00}$ and $R_{04}$ are employed as R-signal representative values for a first pixel line, and $R_{13}$ and $R_{17}$ are employed as R-signal representative values for a second pixel line. Similarly, for third and fourth pixel lines of the color mosaic image, R-signal pixels existing in the respective pixel lines are employed as representative pixels. On the other hand, $B_{02}$ and $B_{06}$ are employed as B-signal representative values for the first pixel line, and $B_{11}$ and $B_{15}$ are employed as B-signal representative values for the second pixel line. Similarly, for third and fourth pixel lines of the color mosaic image, B-signal pixels existing in the respective pixel lines are employed as representative pixels. Thus, when this color pixel arrangement is used, no color interpolation is necessary in the ¼ decimation mode. As can be seen from the figure, positions (phases) of R-signal representative pixels vary by one pixel between two directly adjacent pixel lines. This also holds for the B-signal representative pixels.

Referring to FIGS. 26A to 26D showing two horizontally adjacent blocks of a color mosaic image whose pixels are arranged as shown in FIG. 24, a manner in which decimation sample points are set in the decimation process in the ½ horizontal decimation mode performed by the spatial decimator 305 is described. FIGS. 26B, 26C, and 26D respectively show arrangements of pixel values of a block image reproduced from the respective G, R, and B representative values (sample points).

In the color pixel arrangement shown in FIG. 26A, G-signal pixels are arranged in a checkerboard-like pattern as in the Bayer-array arrangement, and decimation sample points are set at similar positions similar as described earlier with reference to FIG. 23.

For the R and B signals, R-signal pixels existing in each pixel line of the color mosaic image are employed as representative pixels, as in the case of FIG. 25. In the ½ spatial decimation mode, it is necessary to select two pixels as representative pixels from four pixels in each pixel line. To this end, in each pixel line, the pixel position of the B-signal pixel is also selected as a representative pixel position for the R signal, and the pixel position of the R-signal pixel is also selected as a representative pixel position for the B signal. For example, in the first pixel line, R-signal representative pixel values at positions where B-signal pixels are actually located are calculated by interpolation, and thus $R_{02}$ and $R_{06}$ are obtained as representative pixel values. Similarly, in the second pixel line, $R_{11}$ and $R_{15}$ are calculated by interpolation are employed as representative pixel values. For example, the value of $R_{11}$ is calculated according to the following equation.

$$R_{11} = (\tfrac{1}{2})(R_{00} + R_{22})$$

That is, the R-signal value at the B-signal position is calculated by interpolation using R-signal pixel values of pixels located at diagonally adjacent positions, and the resultant calculated value is employed as the representative value.

Representative values at the other positions are also calculated by interpolation using R-signal pixel values of diagonally adjacent pixels lying in adjacent upper and lower pixel lines. As for the B signal, $B_{00}$ and $B_{04}$ are employed as representative values for the first pixel line, and $B_{13}$ and $B_{17}$ are employed as representative values for the second pixel line. The value of $B_{13}$ is given by the following equation.

$$B_{13} = (\tfrac{1}{2})(B_{02} + B_{24})$$

Representative values at the other positions are also calculated by interpolation using B-signal pixel values of diagonally adjacent pixels lying in adjacent upper and lower pixel lines. Also in this case, positions (phases) of B-signal representative pixels vary by one pixel between two directly adjacent pixel lines. This also holds for the R-signal representative pixels.

Note that the manner of setting sampling points is not limited to the examples described above, but sampling may be performed at different pixel positions. Also note that the color filter arrangement is not limited to the examples described above.

In the examples of processing described above with reference to FIGS. 21 to 26, to provide an easier understanding, the motion of an image is assumed to be in the horizontal direction. Note that the processing described above with reference to various embodiments may also be applied when the motion is in the vertical direction. Furthermore, it is also possible to perform the processing two-dimensionally using both horizontal and vertical motion vectors. That is, it is possible to perform the processing for a motion vector with an arbitrary direction.

Figure 27:
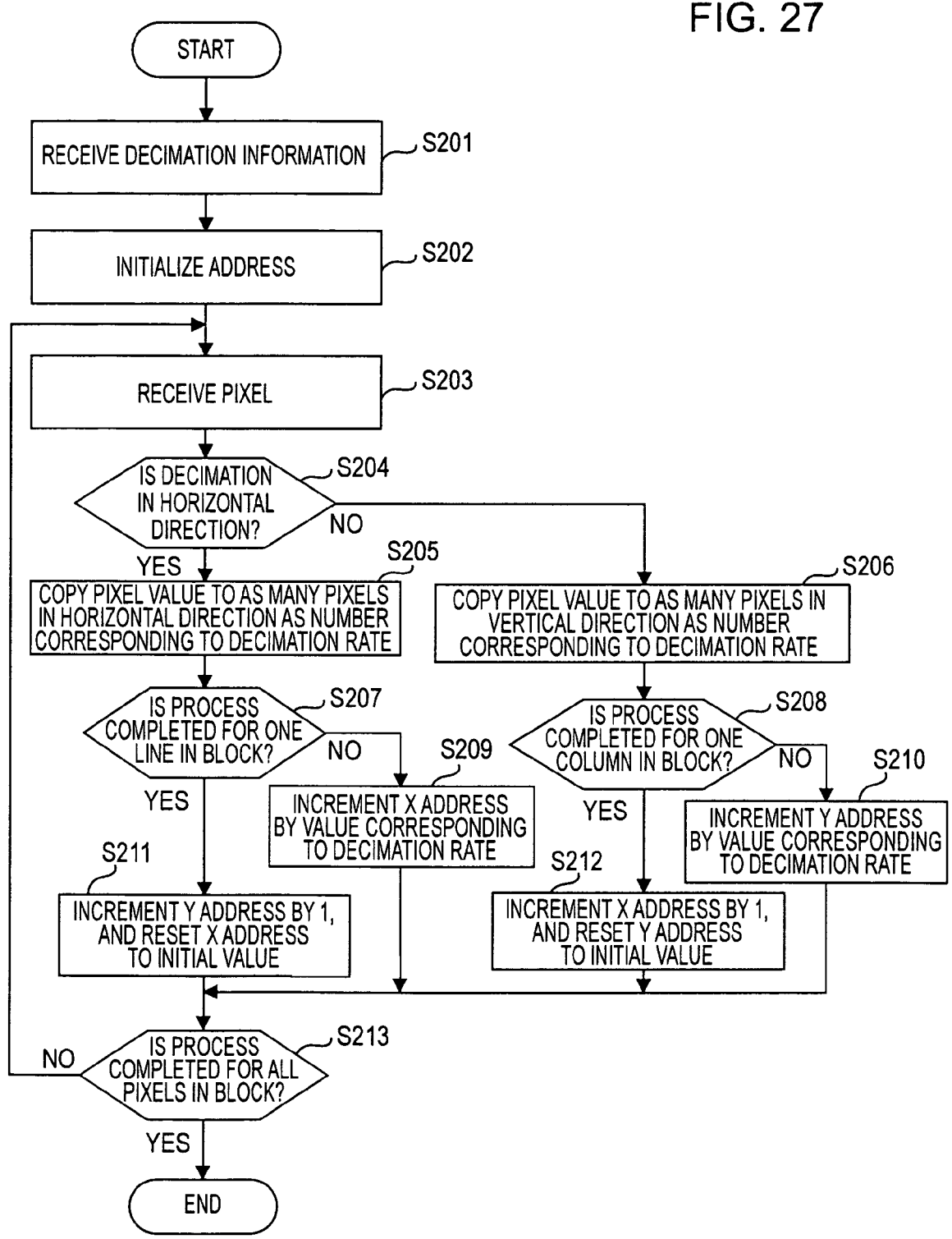
FIG. 27 is a flow chart showing details of a spatial decompression process included in a motion image data conversion process performed by a playback apparatus.

Now, the process performed by the spatial decompression unit 405 (FIG. 17) in the motion image data converter 202 of the playback apparatus 200 shown in FIG. 15, and the process performed by the spatial decompression unit 406 (FIG. 17) are described in detail with reference to a flow chart shown in FIG. 27.

In step S201, the spatial decompression unit 405 or 406 receives decimation information associated with a block from the block distributor 404 shown in FIG. 17. The decimation information includes information indicating which one of the three compression modes was employed when the block of interest to be subjected to the decompression process was compressed by the motion image data converter 104 shown in FIG. 16. That is, the decimation information includes identification information indicating which one of the three modes listed below was employed in the compression process:

a) The compression is performed by both the spatial decimator 305 and the temporal decimator 308.
b) The compression is performed by the spatial decimator 306.
c) The compression is performed by both the demosaicing unit 307 and the temporal decimator 309.

In the case in which the block has been subjected to spatial decimation, information indicating the decimation direction is also included.

In step S202, the spatial decompression unit 405 or 406 resets the address of the image buffer of the mixer 409 so as to point to a pixel position at the upper left corner of the block. In step S203, the spatial decompression unit 405 or 406 receives first image data of each of R, G, and B signals from the block distributor 404.

In step S204, it is determined whether the decimation direction of the block of interest is horizontal. If it is determined that the decimation direction of the block is horizontal, the process proceeds to step S205. However, when the decimation direction is vertical, the process proceeds to step S206.

In step S205, the spatial decompression unit 405 or 406 copies the pixel value supplied from the block distributor 404 to as many pixels located in the horizontal line as the number of pixels decimated in the decimation process (the spatial decompression unit 405 copies the pixel value to four pixels, while the spatial decompression unit 406 copies the pixel value to two pixels). The positions of copying pixels vary depending on whether the pixel values are of the R, G, or B signal. The copying pixel position pattern is identical to the sample point pattern used in the spatial decimation process. The spatial decompression unit 405 or 406 outputs the copied pixel values together with addresses indicating the pixel positions to the mixer 409 or the temporal decimator 308. Thereafter, the process proceeds to step S207.

In step S207, it is determined whether the process is completed for pixels in one line of the present block. In the present embodiment, each block has a size of 4×4 pixels, and thus the process for each pixel line is completed by a one-time execution of the copying process by the spatial decompression unit 405. If the process for one pixel line is completed, the process proceeds to step S211. On the other hand, in the process performed by the spatial decompression unit 406, the process for each pixel line is not completed by a one-time execution. When the process for one pixel line is not yet completed, the process proceeds to step S209.

In step S209, the address is incremented in the X direction by a value corresponding to the decimation rate. Thereafter, the process proceeds to step S213. On the other hand, In step S211, the address is incremented in the Y direction by 1, and the address in the X direction is reset to an initial value indicating the leftmost position of the block. Thereafter, the process proceeds to step S213.

In step S206, the spatial decompression unit 405 or 406 copies the pixel value supplied from the block distributor 404 to as many pixels in the vertical direction as the number of pixels decimated in the decimation process (the spatial decompression unit 405 copies the pixel value to four pixels, while the spatial decompression unit 406 copies the pixel value to two pixels). This copying process is performed in a similar manner to step S205 except that the copying is performed in a direction different by 90°. The spatial decompression unit 405 or 406 outputs the copied pixel values together with addresses indicating the pixel positions to the mixer 409. Thereafter, the process proceeds to step S208.

In step S208, it is determined whether the process is completed for one column of the present block. If it is determined that the process is completed for one column of the present block, the process proceeds to step S212. However, if the process is not yet completed for one column, the process proceeds to step S210.

In step S210, the address is incremented in the Y direction by a value corresponding to the decimation rate, and the process proceeds to step S213. On the other hand, in step S212, the address is incremented in the X direction by 1, and the address in the Y direction is reset to an initial value indicating the leftmost position of the block. Thereafter, the process proceeds to step S213.

In step S213, it is determined whether the process is completed for all pixels in the block. If it is determined that the process is completed for all pixels, the process for the present block is ended. However, if it is determined that the process is not completed for all pixels in the block, the process returns to step S203, The spatial decompression unit 405 or 406 receives next pixel data from the block distributor 404. The process described above is performed repeatedly until the process has been performed for all pixels of the current block.

The decompression process is described below with reference to figures, for each of the R, G, and G signals. First, with reference to FIGS. 22A to 22D, described is a process performed by the spatial decompression unit 406 to decompress, by a factor of 4, a signal produced by the spatial decimator 306 (FIG. 16) by spatially decimating a Bayer-array color mosaic image signal in the horizontal direction by a factor of 4.

As described earlier, the sampling points at which G-signal pixel values are sampled by the spatial decimator 306 in the decimation process vary by one pixel between adjacent pixel lines. The spatial decompression unit 406 expands each representative value by a factor of 4 in the horizontal direction by copying the representative value to a pixel to the left of the decimation sampling point and two pixels to the right of the decimation sampling point. For example, in the first horizontal pixel line, as shown in FIG. 22B, a representative pixel value $G_{01}$ is copied to $G_{00}$, $G_{02}$, and $G_{03}$, and a representative pixel value $G_{05}$ is copied to $G_{04}$, $G_{06}$, and $G_{07}$.

In the next pixel line, a representative pixel value $G_{10}$ is copied to two pixels $G_{11}$ and $G_{12}$. However, a pixel left to the representative pixel $G_{10}$ is outside of the block. In the example shown in FIG. 22A, if the 4×4 block on the left-hand side is a block at the left-hand end of an image, there are no pixels to the left of this block. Therefore, in this case, the representative value $G_{10}$ is copied to three pixels as shown in FIG. 22B. On the other hand, a representative value $G_{14}$ is copied to pixels $G_{15}$ and $G_{16}$ located to the right of the sampling point and also to a pixel $G_{13}$ located outside the right-hand block. In this specific case, there is no existing pixel value assigned to the pixel $G_{13}$, and thus the mixer 48 simply writes the representative value $G_{14}$ at a location corresponding to $G_{13}$. However, in a case in which the pixel $G_{13}$ already has a pixel value defined as a result of a process performed on the 4×4 block on the left-hand side of FIG. 22A, the existing pixel value is employed for this pixel $G_{13}$, and the pixel value $G_{14}$ is not written at this pixel position.

In the case of the R or B signal, as described above, there is no difference in terms of positions of sampling points among pixel lines. As with the G signal, the spatial decompression unit 406 expands each representative value in the horizontal direction by a factor of 4. For example, as for the R signal in the first line, as shown in FIG. 22C, a representative value $R_{00}$ is copied to $R_{01}$ and $R_{02}$, and a representative value $R_{04}$ is copied to $R_{03}$, $R_{05}$, and $R_{06}$. As described earlier, because the block on the left-hand side is located at the left-hand end of the image, the representative value $R_{00}$ is copied to three pixels. As for the B signal in the first horizontal pixel line, as shown in FIG. 22D, a representative pixel value $B_{01}$ is copied to $B_{00}$, $B_{02}$, and $B_{03}$, and a representative pixel value $B_{05}$ is copied to $B_{04}$, $B_{06}$, and $B_{07}$. Because B-signal representative pixels are located at the same positions as those of the R-signal representative pixels for any other pixel line, the decompression process is performed in a similar manner for other pixel lines.

Now, referring to FIG. 23, described is a process performed by the spatial decompression unit 405 to decompress, by a factor of 2, a signal produced by the spatial decimator 305 (FIG. 16) by spatially decimating a Bayer-array color mosaic image signal in the horizontal direction by a factor of 2.

The spatial decompression unit 405 expands each representative value by a factor of 2 in the horizontal direction by copying the representative value to a pixel adjacent to the right of the decimation sampling point. For example, for the G signal in the first pixel line, as shown in FIG. 23B, a representative pixel value $G_{01}$ is copied to $G_{02}$, a representative pixel value $G_{03}$ to $G_{04}$, a representative pixel value $G_{05}$ to $G_{06}$, and a representative pixel value $G_{07}$ to $G_{08}$. Because the pixel $G_{08}$ is located outside the block, the mixer 409 copies the representative pixel value $G_{07}$ to $G_{08}$ only when there is no existing pixel value that has already been assigned to $G_{08}$. On the other hand, there is no pixel value to be copied to any pixel located at the leftmost position ($G_{0x}$) in each pixel line. When there is no pixel value to be copied to a pixel of interest, the mixer 48 calculates the pixel value for the pixel of interest by interpolation using pixel values of two pixels adjacent to the right and left of the pixel of interest. However, in this specific case, because there is no pixel adjacent to the left of the pixel $G_{0x}$, the representative value $G_{0x}$ is copied. As for the G signal, as described earlier, the positions of sampling points vary by one pixel between adjacent pixel lines. Therefore, for the G signal in the second pixel line, a representative pixel value $G_{10}$ is copied to $G_{11}$, a representative pixel value $G_{12}$ to $G_{13}$, a representative pixel value $G_{14}$ to $G_{15}$, and a representative pixel value $G_{16}$ to $G_{17}$.

For the R and B signals, as with the G signal, the spatial decompression unit 405 expands each representative value in the horizontal direction by a factor of 2. For example, for the R signal in the first horizontal pixel line, as shown in FIG. 23C, a representative pixel value $R_{00}$ is copied to $R_{01}$, a representative pixel value $R_{02}$ to $R_{03}$, a representative pixel value $R_{04}$ to $R_{05}$, and a representative pixel value $R_{06}$ to $R_{07}$. For the B signal in the first horizontal pixel line, as shown in FIG. 23D, a representative pixel value $B_{01}$ is copied to $B_{02}$, a representative pixel value $B_{03}$ to $B_{04}$, a representative pixel value $B_{05}$ to $B_{06}$, and a representative pixel value $B_{07}$ to $B_{08}$.

Because the pixel $B_{08}$ is located outside the block, the mixer 409 copies the representative pixel value $B_{07}$ to $B_{08}$ only when there is no existing pixel value that has already been assigned to $B_{08}$. On the other hand, there is no pixel value to be copied to any pixel located at the leftmost position ($B_{0x}$) in each pixel line, and thus the representative value $B_{01}$ is copied as in the case of the G signal. Because B-signal representative pixels are located at the same positions as those of the R-signal representative pixels for any other pixel line, the decompression process is performed in a similar manner for other pixel lines.

Now, referring to FIGS. 25A to 25D, described is a process performed by the spatial decompression unit 406 to decompress, by a factor of 4, a signal produced by the spatial decimator 306 by spatially decimating a color mosaic image signal, whose pixels are arranged as shown in FIG. 24, in the horizontal direction by a factor of 4. In the color array pattern shown in FIG. 24, the G-signal pixels are located at similar manner positions as in the Bayer array pattern, and thus the spatial decimation performed by the spatial decompression unit 406 for the G signal is similar to that described above with reference to FIG. 22B.

As for the R and B signals, as described earlier, the positions of sampling points vary by one pixel between adjacent pixel lines. Thus, for the R signal in the first pixel line, for example, a representative pixel value $R_{00}$ is copied to $R_{01}$ and $R_{02}$, and a representative value $R_{04}$ is copied to $R_{03}$, $R_{05}$, and $R_{06}$. As described earlier, because the block on the left-hand side is located at the left-hand end of the image, the representative value $R_{03}$ is copied to three pixels. For the G signal in the second pixel line, a representative value $R_{13}$ is copied to $R_{12}$, $R_{14}$, and $R_{15}$, and a representative value $R_{17}$ is copied to $R_{16}$, $R_{18}$, and $R_{19}$. Because the pixels $R_{18}$ and $R_{19}$ are located outside the block, the mixer 409 copies the representative pixel value $R_{17}$ to $R_{18}$ or $R_{19}$ only when there is no existing pixel value that has already been assigned to $R_{18}$ or $R_{19}$. On the other hand, there is no pixel value to be copied to two pixels located at the leftmost positions ($R_{1x}$) the representative value $R_{13}$ is copied to these two pixels. For third and fourth horizontal pixel lines, copying is performed in a similar manner except that copying positions are shifted by one pixel. For the B signal, decompression is performed in a similar manner as shown in FIG. 25D.

Now, referring to FIGS. 26A to 26D, described is a process performed by the spatial decompression unit 405 to decompress, by a factor of 2, a signal produced by the spatial decimator 305 by spatially decimating a color mosaic image signal, whose pixels are arranged as shown in FIG. 24, in the horizontal direction by a factor of 2. In the color array pattern shown in FIG. 24, the G-signal pixels are located at similar manner positions as in the Bayer array pattern, and thus the spatial decimation performed by the spatial decompression unit 405 for the G signal is similar to that described above with reference to FIG. 23B.

As for the R and B signals, as described earlier, the positions of sampling points vary by one pixel between adjacent pixel lines. For example, for the R signal in the first horizontal pixel line, as shown in FIG. 26C, a representative pixel value $R_{00}$ is copied to $R_{01}$, a representative pixel value $R_{02}$ to $R_{03}$, a representative pixel value $R_{04}$ to $R_{05}$, and a representative pixel value $R_{06}$ to $R_{07}$. In the second pixel line, a representative pixel value $R_{11}$ is copied to $R_{12}$, a representative pixel value $R_{13}$ to $R_{14}$, a representative pixel value $R_{15}$ to $R_{16}$, and a representative pixel value $R_{17}$ to $R_{18}$. For pixels located at ends of a block, copying is performed in a similar manner as described above. For the B signal, decompression is performed in a similar manner as shown in FIG. 26D.

In the examples of processing described above with reference to FIGS. 21 to 26, to provide an easier understanding, the motion of an image is assumed to be in the horizontal direction. Note that the processing described above with reference to various embodiments may also be applied when the motion is in the vertical direction. Furthermore, it is also possible to perform the processing two-dimensionally using both horizontal and vertical motion vectors. That is, it is possible to perform the processing for a motion vector with an arbitrary direction.

Note that the method of the decompression is not limited to the example described above, but the decompression may be performed in other ways. Also note that the color filter arrangement is not limited to the examples described above.

In the image pickup apparatus using the single-plate solid-state color image sensor according to the present invention, as described above with reference to various embodiments, the amount of motion is detected on a block-by-block basis, and the image compression mode is determined depending on the amount of motion taking into account the characteristics of human visual sense. That is, the color mosaic signal output from the solid-state image sensor is spatially decimated depending on the amount of motion such that spatial blurring and/or generation false colors are suppressed, which would otherwise occur during the demosaicing process that is performed to acquire a complete set of color component data for each pixel by means of interpolation, thereby acquiring a high-quality motion image signal.

Figure 28:
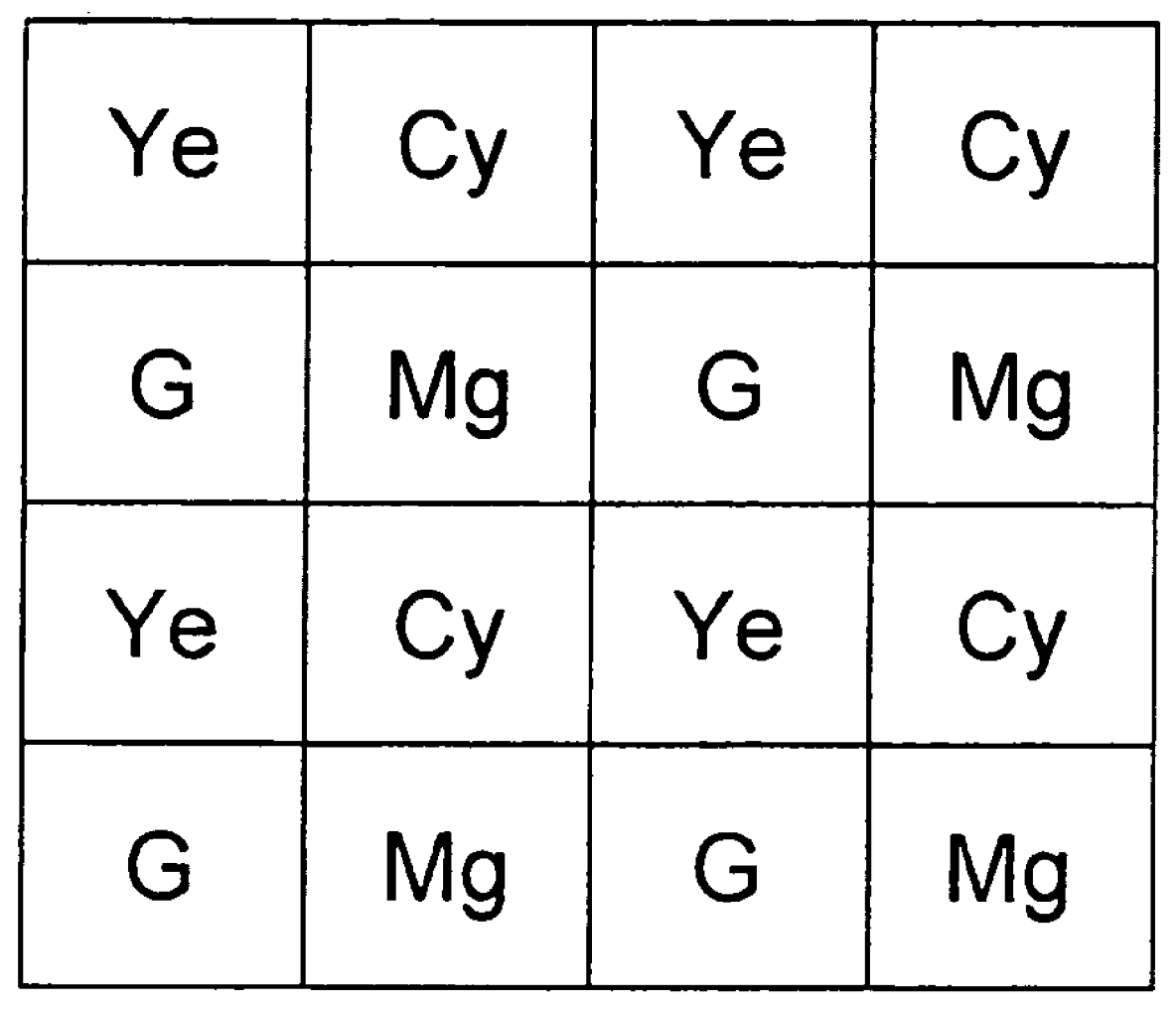

Although in the embodiments described above, the data compression/decompression process is performed for motion image data output from the image sensor has pixels arranged in the Bayer-array color pattern shown in FIG. 21 or in the color array pattern shown in FIG. 24. However, the color pattern is not limited to these patterns, but the present invention may also be applied to image data composed of pixels arranged in other color array patterns. FIG. 28 shows an example of other color array patterns. In this example, a color filter pattern is in the form of an array of complementary colors (yellow (Ye), magenta (Mg), and cyan (Cy)).

Any of the processes disclosed in the present description may be performed by means of hardware, software, or a combination of hardware and software. In the case in which a process is performed by means of software, a program of the process may be installed into a memory disposed in a dedicated computer embedded in hardware and the program may be executed by the computer, or the program may be installed on a general-purpose computer capable of executing various processes and may be executed on the general-purpose computer.

The program may be stored in advance in a storage medium such as a hard disk or a ROM (Read Only Memory). The program may also be temporarily or permanently stored in a removable storage medium such as a flexible disk, a CD-ROM (Compact Disc Read Only Memory), an MO (Magneto-optical) disk, a DVD (Digital Versatile Disc), a magnetic disk, or a semiconductor memory. The program stored on such a removable storage medium may be supplied in the form of so-called packaged software.

Instead of installing the program from the removable storage medium onto the computer, the program may also be transferred to the computer from a download site via radio transmission or via a network such as a LAN (Local Area Network) or the Internet by means of wire communication. In this case, the computer receives the program transmitted in the above-described manner and installs the program on a storage medium such as a hard disk disposed in the computer.

The processes disclosed in the present description may be performed time-sequentially in the same order as that described in the program, or may be performed in parallel or individually depending on the processing power of the computer. In the present description, the term "system" is used to describe a logical collection of a plurality of devices, and it is not necessarily required that the plurality of devices be disposed in a single case.

The present invention has been described above with reference to specific embodiments by way of example and not limitation. It should be apparent to those skilled in the art that various modifications and substitutions are possible without departing from the spirit and the scope of the invention. That is, the embodiments have been described above by way of example and not limitation. The scope of the invention is to be determined solely by the claims.

What is claimed is:

1. A motion image data conversion apparatus comprising:
an input unit configured to input motion image data in the form of color mosaic image data each pixel of which has single-color component data, and
a spatial decimator configured to input motion image data from the input unit and perform a spatial decimation process separately on each color component data of the color mosaic image data;
wherein the spatial decimator selects one or more representative values for each color component data of the color mosaic image data and produces spatially decimated data composed of selected representative values.

2. A motion image data conversion apparatus according to claim 1, wherein in the representative value selection process for each color component data of the color mosaic image data, the spatial decimator sets sample points at which to select representative values of respective color component data at different positions depending on the color components, and employs pixel values at the sample points as the representative values.

3. A motion image data conversion apparatus according to claim 1, wherein in the representative value selection process for each color component data of the color mosaic image data, if no data of a color component to be processed is defined at a pixel position corresponding to a sample point of interest at which to acquire a representative value, the spatial decimator calculates the pixel value at the sample point of interest by performing an interpolation process using pixel values of neighboring pixels having color component data of the same color as the color to be acquired at the sample point of interest, and the spatial decimator employs the calculated pixel value as the representative value.

4. A motion image data conversion apparatus according to claim 1, wherein in the representative value selection process for each color component data of the color mosaic image data, the spatial decimator sets sample points at which to select representative values at different positions depending on pixel lines, and performs the spatial decimation process in different phases depending on pixel lines.

5. A motion image data conversion apparatus according to claim 1, further comprising a block divider configured to receive motion image data from the input unit and divide the received motion image data into blocks on a frame-by-frame basis,
wherein the spatial decimator receives block data from the block divider and performs the representative value selection process on a block-by-block basis.

6. A motion image data conversion apparatus according to claim 5, further comprising a motion detector configured to detect the amount of motion of a subject in each of the blocks generated by the block divider, wherein the spatial decimator performs the spatial decimation process in a mode determined based on the motion information detected by the motion detector.

7. A motion image data conversion apparatus according to claim 6, wherein the motion detector detects a motion vector based on a comparison between different frames of the motion image data.

8. A motion image data conversion apparatus according to claim 6, wherein the spatial decimator performs the spatial decimation process in a spatial decimation direction determined based on the motion information detected by the motion detector.

9. A motion image data conversion apparatus according to claim 6, further comprising a temporal decimator, wherein both the spatial decimation process and a temporal decimation process are performed or one of the spatial decimation process or the temporal decimation process is selectively performed, according to the motion information detected by the motion detector.

10. A motion image data conversion apparatus according to claim 6, further comprising a demosacing unit configured to generate a signal of each color component based on the color mosaic image data, wherein when the amount of interblock motion detected by the motion detector is equal to or less than a predetermined value, a demosaic process and a temporal decimation process are performed without performing the spatial decimation process.

11. A motion image data conversion apparatus according to claim 1, further comprising a single-plate color image sensor, wherein the block divider receives image data output from the single-plate color image sensor.

12. A motion image data reproducing apparatus for reproducing motion image data from converted motion image data, comprising a spatial decompression unit configured to receive spatially-decimated data of each block of each frame of the converted motion image data and decompress the received data separately for each color component, wherein the spatial decompression unit performs the decompression process in different phases depending on the color of the color component data.

13. A motion image data reproducing apparatus according to claim 12, wherein the spatial decompression unit performs the spatial decompression process in different phases depending on pixel lines.

14. A motion image data reproducing apparatus according to claim 12, further comprising a temporal decompression unit configured to perform a temporal decompression process, wherein both the spatial decompression process and the temporal decompression process are performed or one of the spatial decompression process or the temporal decompression process is selectively performed.

15. A motion image data reproducing apparatus according to claim 14, wherein the motion image data reproducing apparatus receives decimation mode information indicating a decimation mode of each block, and performs both the spatial decompression process and the temporal decompression process or selectively performs one of the spatial decompression process and the temporal decompression process, according to the decimation mode information.

16. A motion image data reproducing apparatus according to claim 15, wherein the spatial decompression unit performs the spatial decompression process according to a spatial decimation direction indicated by information included in the decimation mode information.

17. A motion image data conversion method comprising the steps of:

inputting motion image data in the form of color mosaic image data each pixel of which has single-color component data, and performing a spatial decimation process separately on each color component data of the motion image data of the color mosaic image data;

wherein the spatial decimation step including selecting one or more representative values for each color component data of the color mosaic image data and producing spatially decimated data composed of selected representative values.

18. A method of reproducing motion image data from converted motion image data, including the steps of:

receiving spatially-decimated data of each block of each frame of the converted motion image data; and spatially decompressing the spatially-decimated data for each color component data, wherein the spatially decompression is performed in different phases depending on the color component data.

* * * * *